(12) United States Patent
Negel et al.

(10) Patent No.: US 11,519,585 B2
(45) Date of Patent: Dec. 6, 2022

(54) COVERING DEVICES FOR USE WITH VEHICLE PARTS

(71) Applicant: SMR Patent S.à.r.l., Luxembourg (LU)

(72) Inventors: Raimund Negel, Stuttgart (DE); Arne Schmierer, Stuttgart (DE); Daniel Fritz, Stuttgart (DE); Andreas Herrmann, Stuttgart (DE)

(73) Assignee: SMR Patent S.à.r.l., Luxembourg (LU)

( * ) Notice: Subject to any disclaimer, the term of this patent is extended or adjusted under 35 U.S.C. 154(b) by 92 days.

(21) Appl. No.: 16/590,891

(22) Filed: Oct. 2, 2019

(65) Prior Publication Data

US 2020/0103093 A1 Apr. 2, 2020

Related U.S. Application Data

(63) Continuation-in-part of application No. 15/589,043, filed on May 8, 2017, now Pat. No. 10,508,788,
(Continued)

(30) Foreign Application Priority Data

Jan. 24, 2012 (AU) .................................. 2012900267
Feb. 24, 2015 (EP) ...................................... 15156407

(51) Int. Cl.
*F21V 7/24* (2018.01)
*B60Q 1/00* (2006.01)
(Continued)

(52) U.S. Cl.
CPC .............. *F21V 7/24* (2018.02); *B60Q 1/0011* (2013.01); *B60Q 1/0035* (2013.01); *B60R 13/02* (2013.01);
(Continued)

(58) Field of Classification Search
CPC ..... B60Q 1/0011; B60Q 1/0035; B60R 13/02; B60R 13/04; F21V 7/22
See application file for complete search history.

(56) References Cited

U.S. PATENT DOCUMENTS 4,101,698 A 7/1978 Dunning et al.
5,163,731 A 11/1992 Gold
(Continued)

FOREIGN PATENT DOCUMENTS

DE 102008044357 A1 6/2009
DE 102011106595 12/2012
(Continued)

OTHER PUBLICATIONS

European International Search Report for International Application No. PCT/EP2014/069850, dated Feb. 23, 2018, 14 pages.
(Continued)

*Primary Examiner* — Karabi Guharay
(74) *Attorney, Agent, or Firm* — Jones Day

(57) ABSTRACT

A covering device for fully or partially covering one or more of a recess, a flat portion, a curved portion, and a stepped portion of at least one of a vehicle body component and a vehicle part includes a cover element provided by a strip element or a cap element, and at least one lip element which is fixedly or detachably connected to the cover element on at least one of its longitudinal sides, the covering device is designed so that light from a lighting device can shine through at least a portion of the covering device, at least one of the cover element and the at least one lip element is made at least partly of a polymeric substrate which is coated with a chromium-based reflective coating material, and the polymeric substrate and the chromium-based reflective coating are at least partially translucent.

41 Claims, 15 Drawing Sheets

Related U.S. Application Data which is a continuation-in-part of application No. 15/052,120, filed on Feb. 24, 2016, now Pat. No. 9,643,532, application No. 16/590,891, which is a continuation-in-part of application No. 15/439,188, filed on Feb. 22, 2017, now Pat. No. 10,703,281, which is a continuation-in-part of application No. 14/936,024, filed on Nov. 9, 2015, now Pat. No. 9,656,601, which is a continuation-in-part of application No. 14/374,376, filed as application No. PCT/AU2013/000047 on Jan. 24, 2013, now Pat. No. 9,181,616.

(51) Int. Cl.
| | |
|---|---|
| *B60R 13/02* | (2006.01) |
| *B60R 13/04* | (2006.01) |
| *F21V 23/04* | (2006.01) |
| *F21V 17/00* | (2006.01) |
| *F21V 3/12* | (2018.01) |
| *B60R 11/00* | (2006.01) |

(52) U.S. Cl.
CPC ............... *B60R 13/04* (2013.01); *F21V 3/12* (2018.02); *F21V 17/00* (2013.01); *F21V 23/0485* (2013.01); *B60R 2011/004* (2013.01)

(56) References Cited

U.S. PATENT DOCUMENTS

| | | | |
|---|---|---|---|
| 5,377,045 A | 12/1994 | Wolfe et al. | |
| 6,416,194 B1 | 7/2002 | Demiryont | |
| 6,586,048 B2 | 7/2003 | Welch, Jr. et al. | |
| 6,586,098 B1 | 7/2003 | Coulter et al. | |
| 6,699,313 B2 | 3/2004 | Coulter et al. | |
| 6,906,257 B2 | 6/2005 | Saccomanno et al. | |
| 7,914,189 B2 | 3/2011 | Sugiura et al. | |
| 8,820,990 B2 | 9/2014 | Wegner et al. | |
| 10,464,476 B1 * | 11/2019 | Mazuir | B60Q 3/0216 |
| 2002/0187350 A1 | 12/2002 | Saccomanno et al. | |
| 2003/0134151 A1 | 7/2003 | Usuki et al. | |
| 2003/0141096 A1 | 7/2003 | Saccomanno | |
| 2003/0207113 A1 | 11/2003 | Coulter et al. | |
| 2005/0008848 A1 | 2/2005 | Saccomanno et al. | |
| 2009/0129106 A1 | 5/2009 | Sugiura et al. | |
| 2012/0292942 A1 | 11/2012 | Gold | |

FOREIGN PATENT DOCUMENTS

| | | | |
|---|---|---|---|
| DE | 102012000479 A1 | 3/2013 | |
| EP | 1305373 | 9/2008 | |
| EP | 2062784 A2 | 5/2009 | |
| EP | 2407346 A1 | 1/2012 | |
| EP | 2525138 A1 | 11/2012 | |
| GB | 1504814 | 3/1978 | |
| WO | WO 2011/154667 A1 | 12/2011 | |
| WO | WO-2013110122 A1 * | 8/2013 | ......... C23C 14/0015 |

OTHER PUBLICATIONS

International Preliminary Report on Patentability, including Transmittal, for International Application No. PCT/EP2014/069850, dated Mar. 22, 2016, 8 pages.

International Search Report and Written Opinion for International Application No. PCT/EP2014/069850, dated Feb. 23, 2018, 14 pages.

Written Opinion of the International Searching Authority, Application No. PCT/AU2013/000047, dated Feb. 21, 2013.

Takanashi et al., 1992, "Antiferromagnetic Exchange Coupling and Magnetoresistance of Fe/Cr Multilayers: Influence of Third Elements in Cr Layers," Journal of the Physical Society of Japan, 61(11):4148-4154.

* cited by examiner

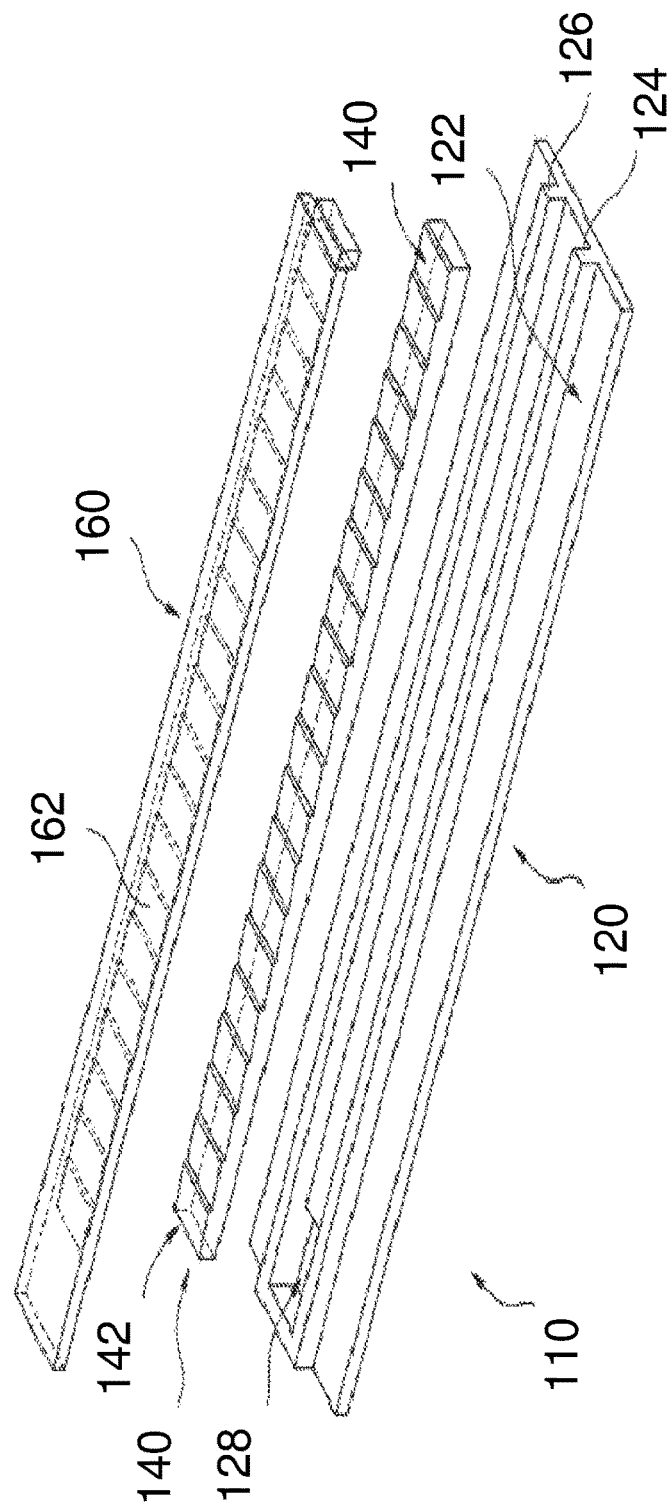
FIG. 1
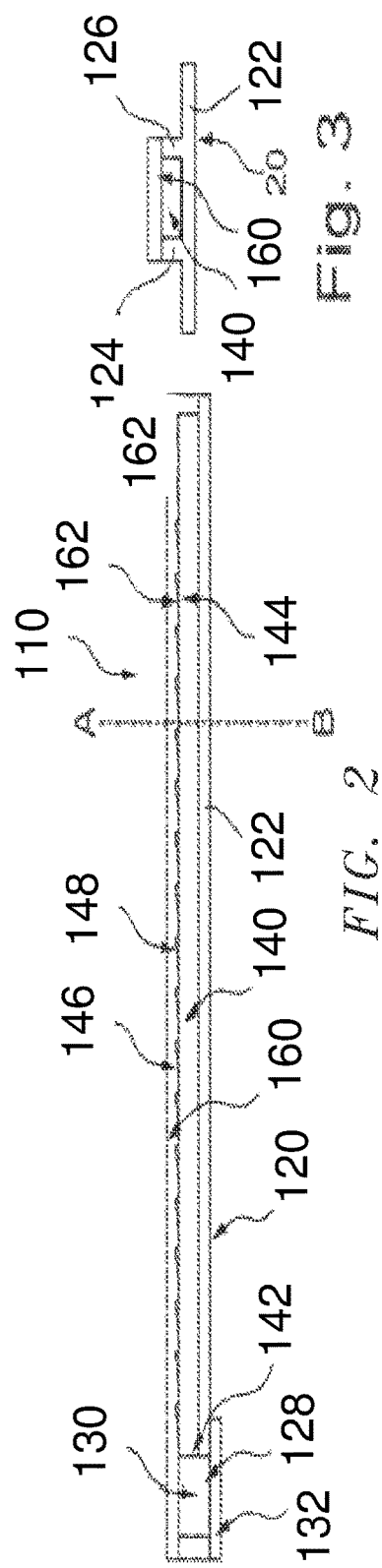
FIG. 2
Fig. 3

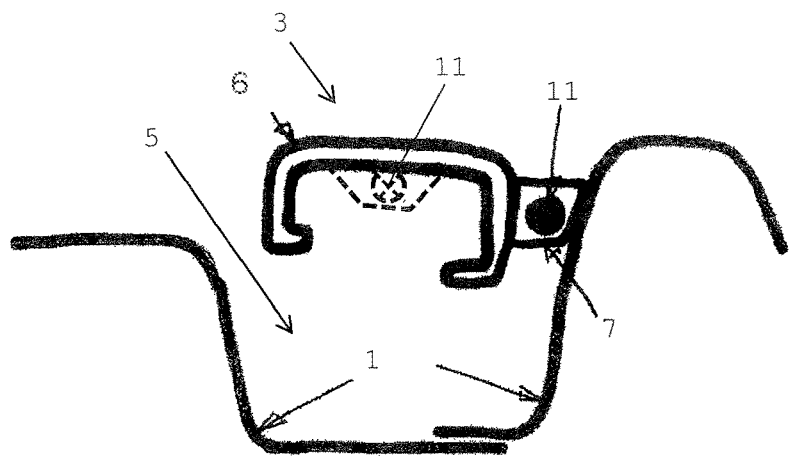
FIG. 18
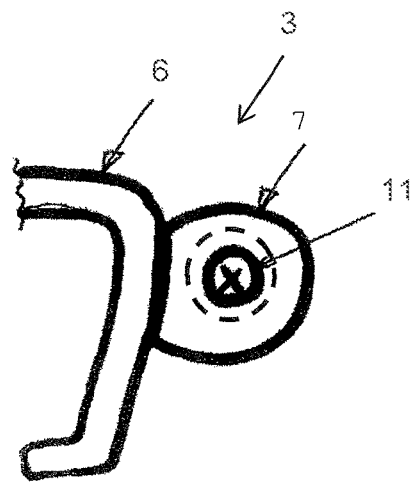
FIG. 19
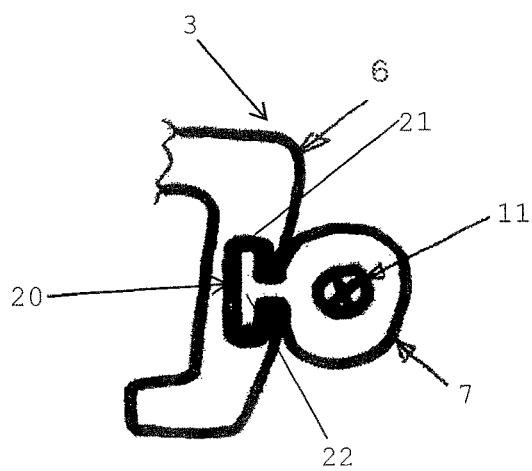
FIG. 20
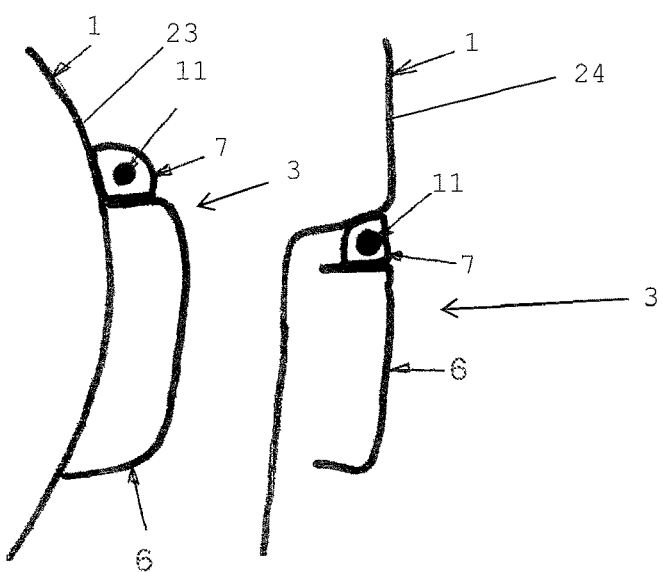
FIG. 21     FIG. 22

COVERING DEVICES FOR USE WITH VEHICLE PARTS

CROSS-REFERENCE TO RELATED APPLICATIONS

This application is a continuation-in-part of U.S. patent application Ser. No. 15/589,043, filed May 8, 2017, which is a continuation-in-part of U.S. patent application Ser. No. 15/052,120, filed Feb. 24, 2016, which claims the benefit of foreign priority to European Patent Application No. 15156407.7, filed Feb. 24, 2015; and this application is a continuation-in-part of U.S. patent application Ser. No. 15/439,188, filed Feb. 22, 2017, which is a continuation-in-part of U.S. patent application Ser. No. 14/936,024, filed Nov. 9, 2015, which is a continuation-in-part of U.S. patent application Ser. No. 14/374,376, filed Jul. 24, 2014 and now issued as U.S. Pat. No. 9,181,616, which is a national stage entry of International Patent Application No. PCT/AU2013/000047, filed Jan. 24, 2013, which claims the benefit of foreign priority to Australian Patent Application No. 2012900267, filed Jan. 24, 2012, each of which is herein incorporated by reference in its entirety for all purposes.

BACKGROUND

1. Field

The present disclosure relates generally to covering devices for a vehicle body component or vehicle part, and a methods of making a lamp for a vehicle or for use with rearview means including mirrors or camera pods such as a blinker.

2. Description of Related Art

Vehicles generally have covering devices such as roof strips which cover a gap between the roof of the vehicle and a side panel. Another example of a covering device includes a cap which covers a lighting elements such as a cap for use on a rearview device with a blinker. Such covering strips or covering caps are normally made of a plastics-metal composite.

With regards to lamps for vehicles, side-view mirrors, or other viewing means, European Patent No. 1 657 488 B1 describes one example of such a lamp. In this lamp, a weld seam or an adhesive seam inseperably connects a substantially U-shaped front housing part, which is configured as a transparent clear lens, to a back panel in order to provide a closed, watertight housing within which at least one illuminant is arranged. The housing components are described as made of hard plastics, preferably polymethyl methacrylate (PMMA) or plastics of this family. The back panel can also be made of another plastic, such as polycarbonate (PC), polybutylene terephthalate (PBT) or the like.

Another such lamp for vehicles is described in European Patent No. 1 852 306 B1, in which an illuminant, the outside, or the inside of a U-shaped front housing part features a lens system. The lens system is in the form of a surface texturing for the focusing, parallel direction, or scattering of the emitted light.

European Application No. 1 099 902 A1 describes a unit which has a light conductor with a long, curved light surface with a coupling point for at least one light source. At least part of the light is transmitted through the coupling point parallel to the light surface. The light conductor is formed, so that the light is reflected at least partly along the light surface by total internal reflection. Reflectors are provided to reflect a certain amount of light to the light surface European Patent No. 2 020 610 B1 describes a device which has an optical light guide with an end face to introduce light rays, an emission section has a lateral surface that forms a light beam emission face, a bend is interposed between the introduction face and the section, a wedge of the bend projects toward exterior and beveled to present upper and lower facets to reflect incident light rays, where a part of rays escapes outside the guide through the facets, prisms modify orientation of the escaped rays, such that the escaped rays complete a light beam from the emission face in homogenous and continuous manner.

U.S. Pat. No. 9,022,631 describes a flexible light assembly which includes a plurality of light guides that may be operably connected to one or more LED light sources. The light guides may include smooth surfaces that internally reflect light except at selected areas having irregular surface features that permit the escape of light to provide illuminated letters, numbers, designs, or the like. The light guides and LED light source may be disposed within a flexible housing.

Chinese Patent No. CN 20438984 describes a light guide plate dot structure including an upper polarizing plate, liquid crystal glass, a lower polarizing plate and a wedge-shaped light guide plate from top to bottom, wherein an inverse prism sheet is arranged on the upper surface of the light guide plate; the upper surface of the inverse prism sheet is coated with a scattering layer; a plurality of dots are fixedly mounted on the lower surfaces of the light guide plate; a wrap angle piece is arranged at each of the corners of the light guide plate. According to the novel light guide plate dot structure, the dots are arranged on the lower surface of the light guide plate; the density and the shapes of the dots are different, so that the problem of poor brightness of a large-size light guide plate is solved conveniently, and the light utilization ratio is increased; meanwhile, the inverse prism sheet is arranged, external light can be utilized in real time, the brightness of a liquid crystal display is improved, the power consumption of a light source is reduced, the cost is lower, and the manufacture processes are simplified; in addition, as the upper polarizing plate is shorter than the lower polarizing plate, the anti-dropping capability of a liquid crystal display module is improved, and the thickness of the whole liquid crystal display module is reduced accordingly.

Chinese Patent No. CN 108515001 describes a method and device for diffusing coating to be coated on a light guide plate. The method includes the steps that the light guide plate is conveyed to the position below a coating device through a conveying device, and the acrylic resin coating in which scattering particles are added is coated on the light guide plate as the diffusing coating by the coating device; the light guide plate with the diffusing coating coated on the surface is further conveyed into a drying device through the conveying device, and the diffusing coating is made cured; and the light guide plate with the diffusing coating is further conveyed to a material receiving device through the conveying device, and a light guide plate product is obtained. According to the method and device for the diffusing coating to be coated on the light guide plate, the acrylic resin coating in which the scattering particles are added is coated on the light guide plate as the diffusing coating by adopting the coating device, the diffusion coating is cured by the drying device, and the light guide plate product is obtained; and because the diffusing coating is adopted to replace part of a film material, the thickness of a backlight source device obtained in production is substantially reduced, and the technical effects that the machining efficiency is high, and the light guide plate product is high in reliability can be achieved.

United States Patent Application Publication No. 2013/0336004 describes a flexible light assembly including a plurality of light guides that may be operably connected to one or more LED light sources. The light guides may include smooth surfaces that internally reflect light except at selected areas having irregular surface features that permit the escape of light to provide illuminated letters, numbers, designs, or the like. The light guides and LED light source may be disposed within a flexible housing.

International Patent Application Publication No. WO 2018/0167096 describes a rearview device including a housing, a bezel and a rearview element used for vehicles. In one embodiment the bezel includes a transparent or chrome-based coating as to allow one or more lighting assemblies positioned in or beneath the bezel to illuminate the surrounding and provide different functions to the driver or other persons. For example, different indicator functions can be provided. Different electronic means may be placed in or beneath the bezel to optimize the used space inside the rearview device.

The construction of these known lamps is expensive. In addition, welding processes negatively affect the tolerances of adjacent clearances. The necessity of a weld seam or adhesive seam also limits the design of the lamps, as with a blinker in a side-view mirror arrangement of a vehicle.

German Patent Application No. 10 2011 103 200 A1 describes a light window for an illuminated unit in a side-view mirror where the light window fits the outer contour of the housing of the side-view mirror and seals an opening in the housing of the side-view mirror. The light window serves as a light conductor and features outcoupling structures on at least one area. The light window is produced out of an optical film which has a molded coating and is configured as a light conductor, where the optical film contains at least one outcoupling structure. A crystal-clear base material or, alternatively, a colored transparent material can be used for production and it can be produced in a single extrusion die. To produce the light window, the optical film is placed into the extrusion die so that a protective layer is injected on the die side of the film and the coating is injected on the core side of the film. The protective layer can be made of PC film and the coating can be made of PC or PMMA.

Molding a coating on a film to produce a light window, such as a blinker, is complicated particularly since a fastening on a housing is also needed.

SUMMARY

In one aspect, a covering device configured to fully or partially cover one or more of a recess, a flat portion, a curved portion, and a stepped portion of at least one of a vehicle body component and a vehicle part, the covering device including: a cover element provided by a strip element or a cap element, and at least one lip element which is fixedly or detachably connected to the cover element on at least one of its longitudinal sides, where the covering device is designed so that light from a lighting device can shine through at least a portion of the covering device, where at least one of the cover element and the at least one lip element is made at least partly of a polymeric substrate which is coated with a chromium-based reflective coating material, and where the polymeric substrate and the chromium-based reflective coating are at least partially translucent such that light from the lighting device can shine through.

The at least one lip element may be fixed to the cover element integrally or may be a separate component which is fixed using at least one of extrusion, adhesive bonding, interlocking and clamping.

The cover element may include at least one holder for receiving at least one fixing portion of the at least one lip element.

The covering device may further include the lighting device, where the lighting device has at least one of a light source and at least one afterglow pigment which is mixed with material of the covering device or is applied to an outside of the covering device as an afterglow ink, afterglow foil or afterglow paint.

The covering device may further include at least one light guide which is integrally formed into the covering device or provided as a separate component.

The light guide may be at least one of extruded or injection molded into a cover element and arranged in a cavity of the covering device.

The light guide may be at least one of coupled to the at least one light source and formed as an elongate light guide, a light-guiding foil or a light-guiding fabric.

The covering device may be a functional element which includes a display, a touch screen, a protective roof strip, a roof rail, a handle strip, or an impact protection strip.

The covering device may further include at least one light conductor, and at least one light conditioning area configured to be used for tinting, dying, reflecting, or scattering within at least one of the at least one light conductor using at least one additive for the polymeric substrate.

The chromium-based reflective coating may be an alloy of chromium and a dopant material, the dopant material being selected from hexagonally close-packed transition metals, and the alloy having a crystal structure of a primary body-centered cubic phase in coexistence with a secondary omega hexagonally close-packed phase.

The alloy may be a binary alloy of chromium and the dopant material.

An atomic percentage of the dopant material in the alloy may range from about 1.9 at. % to about 5.8 at. %.

The dopant material may be selected from hexagonally close-packed transition metals zirconium, titanium, cobalt, hafnium, rubidium, yttrium and osmium.

The dopant material may be selected from hexagonally close-packed transition metals zirconium, titanium and cobalt.

The alloy may be a binary alloy and the dopant material may be zirconium, and where an atomic percentage of the zirconium in the binary alloy ranges from about 4.5 at. % to about 5.8 at. %.

The alloy may be a binary alloy and the dopant material may be titanium, and where an atomic percentage of the titanium in the binary alloy ranges from about 1.9 at. % to about 5.8 at. %.

The alloy may be a binary alloy and the dopant material may be cobalt, and where an atomic percentage of the cobalt in the binary alloy ranges from about 1.9 at. % to 5.7 at. %.

The chromium-based reflective coating may have a thickness of 200 nm, 100 nm, from 40 nm to 80 nm, from 50 nm to 70 nm, or about 60 nm.

The polymeric substrate may be formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-arylates, acetal and blends of these.

The polymeric substrate may be formed from a material selected from the group consisting of polycarbonate, poly (2,2'-dihydroxyphenylpropane) carbonate, polydiethyleneglycol bis(allyl carbonate), polymethylmethacrylate, polystyrene, and blends thereof.

The polymeric substrate may include a pre-coated film which is a hardcoat, an inorganic oxide, or a thin metal film, or a combination thereof.

In another aspect, a system includes a covering device and at least one lighting device, where the system provides a multifunction lamp unit.

The vehicle body component which is at least partly covered by the covering device may be a roof panel, a door panel, a wing panel, a bonnet panel, a tailgate panel, a front apron panel, a front bumper panel, a rear bumper panel, a rear apron panel, or a side panel of a vehicle.

The vehicle body component may include a first body component and a second body component, the first and the second body components together form a recess, the recess is covered at least in part by the covering device, and a light from a lighting device shines through at least a portion of the covering device.

The vehicle body component and the vehicle part together may form a recess, the recess being covered at least in part by the covering device, and a light from a lighting device may shine through at least a portion of the covering device.

The vehicle part may be a side window, a sunroof, a glass roof, a windshield, a rear window, a radiator grill, a vehicle lamp, a vehicle mirror, a vehicle mirror casing, a camera, a camera pod, a display, a touch screen, or a rear view device.

The at least one lighting device may be part of at least one of the vehicle body components, the vehicle part, and the covering device.

The first body component may be a roof panel and the second body component may be a side panel.

In another aspect, a vehicle may include a system where the covering device extends in at least one of a longitudinal direction and a transverse direction of the vehicle along a recess in the vehicle body component or in the system.

The covering device may extend in at least one of a longitudinal direction and a transverse direction of the vehicle along a recess in a first or a second body component of the system or along a common recess of the first and second body components of the system.

The covering device may extend in at least one of a longitudinal direction and a transverse direction of the vehicle along a recess between the vehicle body component and another vehicle body component.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIG. 1 is a diagram illustrating an example of a housing, a light conductor and a clear lens of a lamp.

FIG. 2 is a longitudinal cross-sectional view of the light from FIG. 1.

FIG. 3 is a cross-sectional view along the line A-B in FIG. 2.

FIG. 18 is a cutaway view of a portion of another example of two adjacent body components and a covering device.

FIG. 19 is a cross-sectional view of a portion of an example of a covering device with an integrated light guide.

FIG. 20 is a cross-sectional view of a portion of another example of a covering device with an integrated light guide.

FIG. 21 is a cross-sectional view of a portion of an example of a curved portion of a body component.

FIG. 22 is a cross-sectional view of a portion of an example of a stepped portion of a body component.

Figure 4:
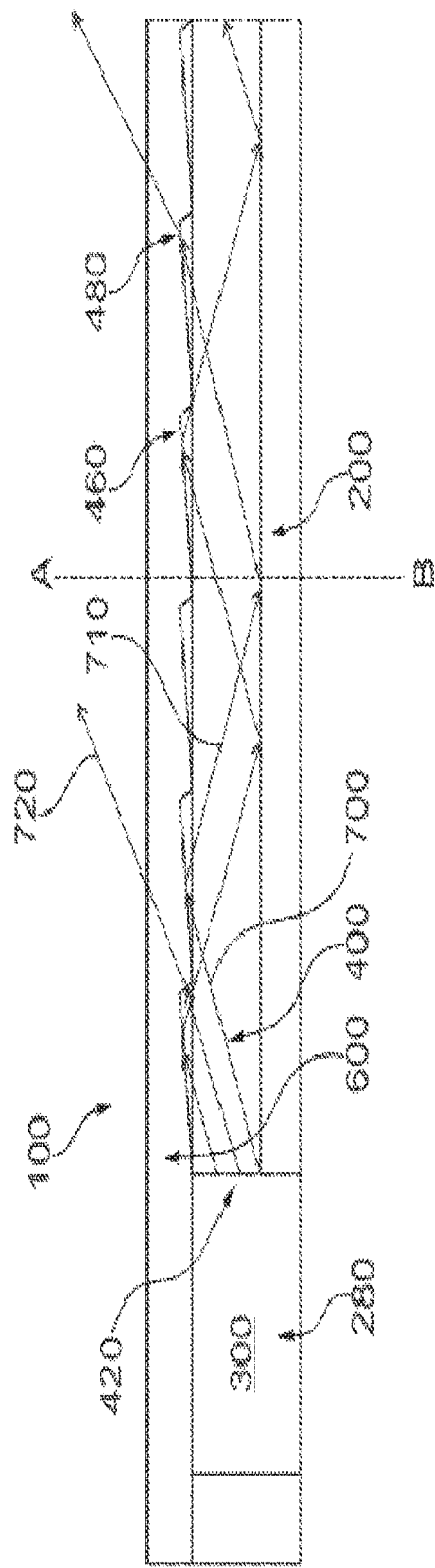
FIG. 4 is a longitudinal cross-sectional view of a part of another example of a lamp.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

The term "entity" relates here to any biological and non-biological life form, material and/or machine, which can gather the signals with which the vehicle is conveying information and/or induces some kind of action based on this signals. This can comprise for example a device, for example a mechanical, electromechanical, electronic, electromagnetic, optical, chemical or biological device and/or any combination thereof, for example a computer, a robot, an artificial intelligence, but also an animal and/or a plant.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

As illustrated in FIG. 1, a lamp 110 includes a housing 120, a light conductor 140 and a covering device 160. A light foil may be arranged within the lamp 110 in accordance with the description of this application. Details related to the light foil are provided at least in reference to FIGS. 6-13 and their accompanying description. These three components are manufactured in an injection molding process. For example, the light conductor 140 can be produced out of PC in a first phase, the covering device 160 out of crystal-clear or tinted PMMA in a second phase, and the housing 120 out of ABS (acrylonitrile-butadiene-styrene) in a third phase. As a result, one unit is formed, for example, as illustrated in FIGS. 2 and 3 in longitudinal section and cross-section, respectively.

Still referring to FIGS. 1-3, the housing 120 is formed with a back panel 122 and two webs 124 and 126 to receive the light conductor 140 between the webs 124 and 126 on the back panel 122. In addition, a recess 128 which builds an installation space 130 for an illuminant, which is not illustrated, is provided in the housing 120. The illuminant can include an LED on a printed circuit board, and the installation space 130 together with all plug boxes can be sealed by a lid 132.

The light conductor 140 features one end having at least one light incoupling area 142 adjacent to the installation space 130. Its surface, which borders the lower surface of the covering device 160, can be provided with a light conductor system 144 which provides the total reflection areas 146 and outcoupling area 148 for the light that enters the light conductor 140 at each incoupling area 142. Because the covering device 160 is formed with a corresponding covering device system 162 on its surface opposite the light conductor system 144 of the light conductor 140, and also because the refractive indexes of the plastics of the covering device 160 and of the light conductor 140 differ, total reflection at the outcoupling areas 148 is excluded.

The optical path within a lamp produced according an example of the invention will be explained in more detail below in reference to FIGS. 4 and 5. The illustrated lamp 100 differs from the lamp 110 due to a different geometry for the light, whereas the light conductor 140 of the lamp 110 has a rectangular shaped cross section.

Figure 5:
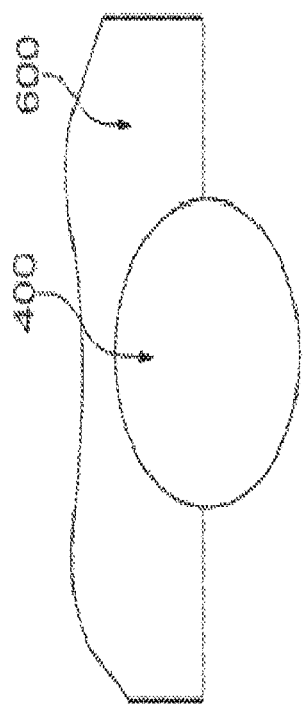
FIG. 5 is a cross-sectional view along the line A-B in FIG. 4.

To be enclosed between the back panel 122, the webs 124 and 126 of the housing 120, and the covering device 160, the light conductor 400 of the lamp 100 has a circular cross section, as illustrated in FIG. 5. In addition, the shape of the housing 200 and the covering device 600 of the lamp 100 of FIGS. 4 and 5 is also adapted to have this circular shape.

The housing 200 is again configured into an installation space 300 for an illuminant by means of a recess 280.

The light conductor 400 in turn features incoupling areas 420 for light rays from the illuminant, these light rays propagating in the form of the light rays 700 in the light conductor 400 in order to be deflected into the total reflecting light rays 710 at the total reflection areas 420 and into the light rays 720 leaving the lamp 100 at the outcoupling areas 480.

The shape of the covering device 600 is adapted not only to the shape of the light conductor 400, but can also satisfy any design requirements on the lamp 100. For example, the surface can feature a wave form as illustrated in FIG. 5.

Figure 6:
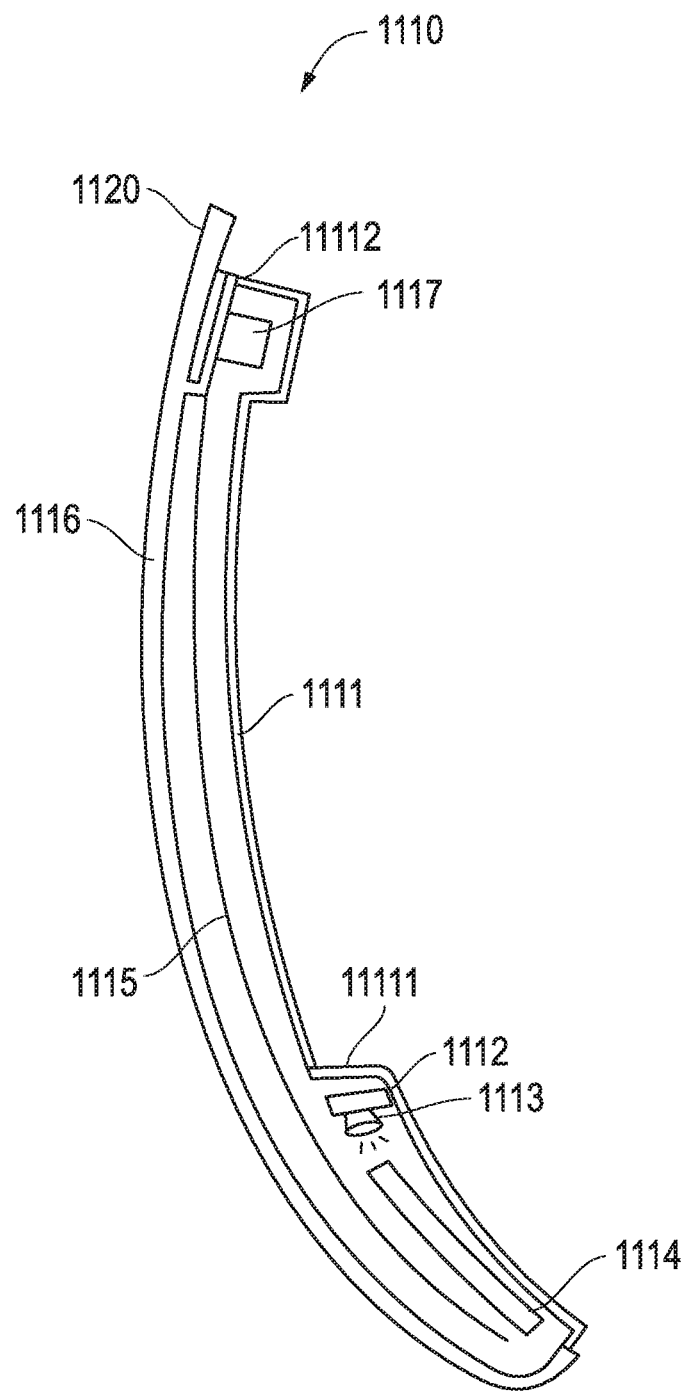
FIG. 6 is a cross sectional view of another example of a multifunction lamp unit making use of a light foil.

Referring now to FIG. 6, a cross section of another example of a multifunction lamp unit 1110 making use of a light foil 1115 is illustrated. The lamp unit 1110 is provided as a single module which can be easily installed in a rear view device of a vehicle. Such a rear view device can include at least one reflective element and/or camera. The outer surface of the module is adapted to the contour of the rear view device into which it is to be installed. Further details on such an adaption are, in particular, described in U.S. Pat. No. 8,950,914 B2 which is incorporated herein by reference in its entirety.

The lamp unit 1110 comprises a housing 1111 with a first recess 11111 for housing a first illuminant or light source with a printed circuit board 1112 carrying an LED 1113. Light emitted from the first light source 1112, 1113 is coupled into a first light conductor 1114, with the respective light being decoupled from the first light conductor 1114 at one end of the lamp unit 1110.

The lamp unit 1110 further comprises a second light source in the form of a light foil 1115. Such light foils are known in the form of, for example, light tapes of the company Light Tape Limited or in the form of a printed lighting as distributed by the company Center of Process Innovation Limited. Making usage of such a light foil 1115 reduces the overall weight of the lamp unit 1110 and enables the production of smaller modules. Still further, the use of light foils 1115 allows in-process integration as it can be inserted into a mould and over-mould.

The light foil 1115 extends along a light window 1116 which is provided as a lid for the housing 1111. The connection between the light window 1116 and the housing 1111 is suited to provide a sealed module which is beneficial when used in an external rear view device.

Still further, the light foil 1115 is connected with a control unit 1117 arranged within a second recess 11112 of the housing 1111. Said control unit 1117 can also be connected to the printed circuit board 1112 and a control device within the vehicle to which the rear view device with the lamp unit 1110 is attached.

As depicted in FIG. 6, the light foil 1115 extends from one end of the lamp unit 1110 to the other end thereof and, thus, overlaps the first light source 1112, 1113 and the first light conductor 1114. The light foil 1115 runs parallel to the interior surface of the light window 1116.

The light window 1116 is acting as a clear lens and is connected to a casing part or covering device 1120 of the rear view device as described in U.S. Pat. No. 8,950,914 B2.

From the outside of the lamp unit 1110 of FIG. 6, a viewer can only see the light foil 1115 through the light window 1116, whereas the first light source 1112, 1113 and the first light conductor 1114 are hidden. In order to also hide the light foil 1115 when it is not lit, the light window 1116 can be coated with a chromium-based reflective coating which is translucent. In fact, it is preferred to produce the light window 1116 from a polymeric substrate coated with a chromium-based reflective coating as described in U.S. patent application Ser. No. 14/936,024, which is incorporated herein by reference in its entirety.

Figure 8:
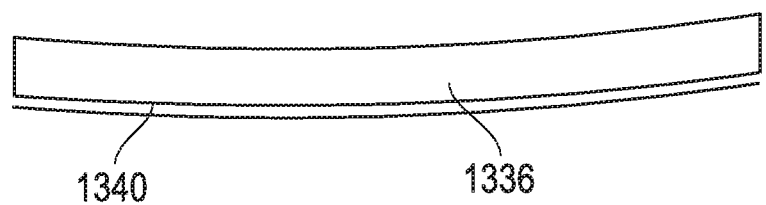
FIG. 8 is a cross sectional view of a clear lens with a chromium-based coating.

FIG. 8 depicts a polymeric substrate in the form of a covering device 1336 or light window provided with a coating 1340. The coating 1340 is at least in part permeable to light originating, for example, from a light foil placed behind the covering device 1336.

Thus, it is possible to hide both light sources shown in FIG. 6, i.e. the printed circuit board 1112, the LED 1113 and the light foil 1115, and to hide the light conductor 1114 by making usage of the covering device 1336 together with the coating 1340 instead of the light window 1116. The light unit 1110 can be integrated into a casing with a metallic coating such that the whole surface will have an appealing metallic look. As soon as the light foil 1114 is lit, respective light rays will pass not only through the covering device 1336 but also through the chromium-based coating 1340 thereon. But the first light source 1112, 1113 and the first light conductor 1114 will remain hidden.

Figure 9:
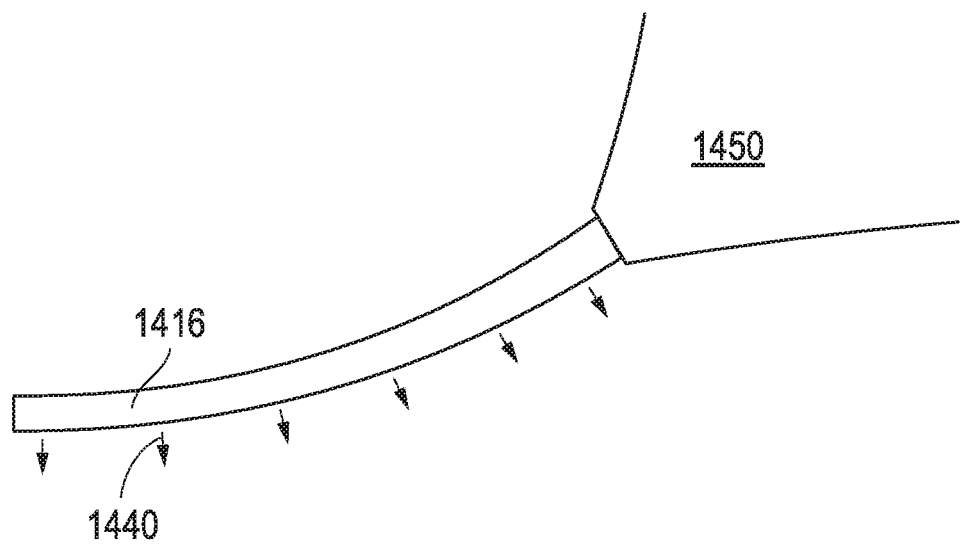
FIGS. 9, 10, 11, 12, and 13 are cross sectional views of the multifunction lamp units together with the decoupled light rays and/or light cones.

FIG. 9 illustrates light rays 1440 emitted from a light foil within a lamp unit 1416 as well as a light cone 1450 decoupled from a light conductor into which light from an LED is coupled in line with the example of FIG. 6. Different functions can be fulfilled by said light rays 1440 and said light cone 1450.

For example, the lamp unit 1416 can be a turn signal indicator module of a rear view device of a vehicle, in particular an exterior mirror, such that the light cone 1450 has to fulfill the ECE (Economic Commission for Europe) regulations ensuring that a region beginning from 5° from the longitudinal axis of the vehicle, up to 60° to the longitudinal axis of the vehicle in the opposite direction of movement is lit up. The light rays 1440 could provide a decorative effect or additional warning effect.

Figure 7:
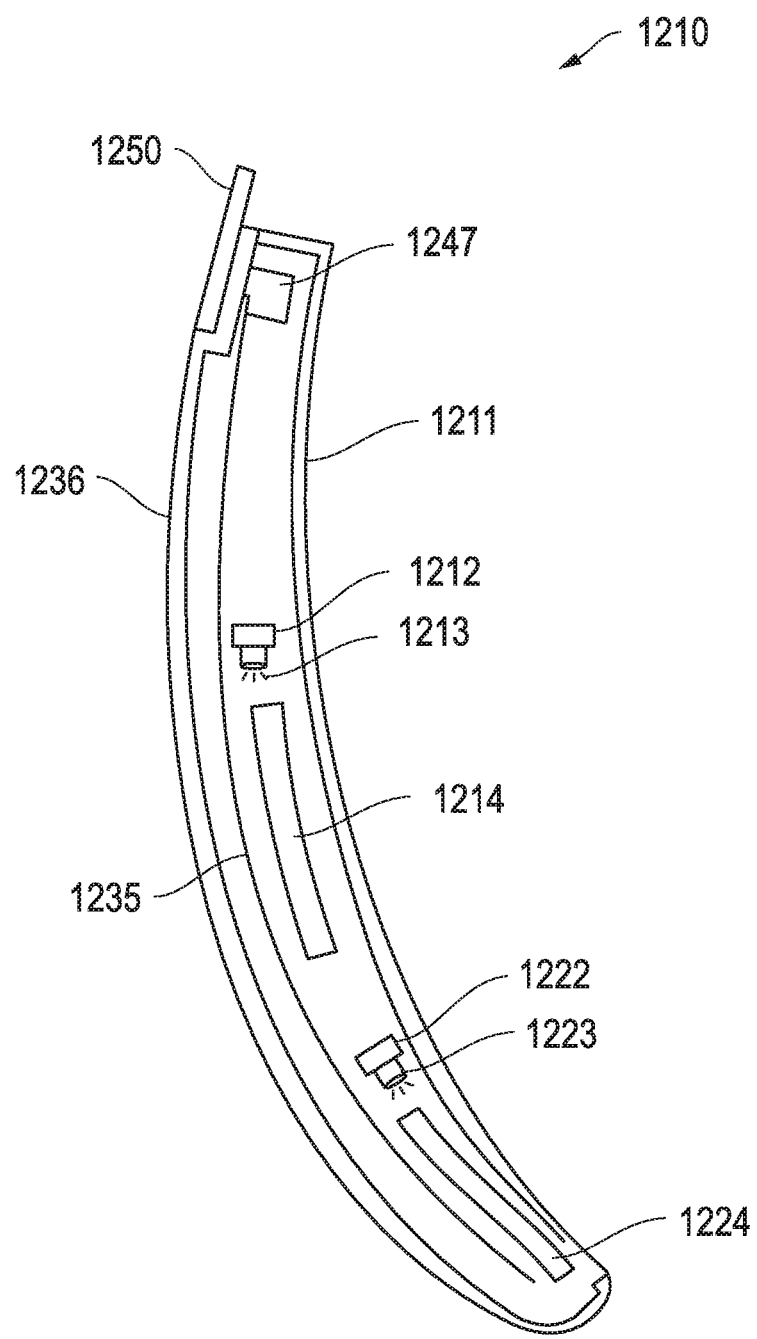
FIG. 7 is a cross sectional view of yet another example of a multifunction lamp unit making use of a light foil.

FIG. 7 shows an alternative example of a multifunctional lamp unit 1210 of the invention which, in contrast to the lamp unit 1110 of FIG. 6, has three light sources. The lamp unit 1210 makes usage not only of a first printed circuit board 1222 and a first LED 1223 for coupling light into a first conductor 1224 and a light foil 1235, but in addition uses a second printed circuit board 1212 and a second LED 1213 for coupling light into a second conductor 1214. The light foil 1235 extends along a covering device 1250 and a lens 1236, and overlaps both of the other two light sources 1212, 1213 and 1222, 1223 as well as their respective light conductors 1214, 1224. The covering device 1250 and the lens 1236 may be coated with the translucent chromium-based coat, but do not have to be coated.

Figure 10:
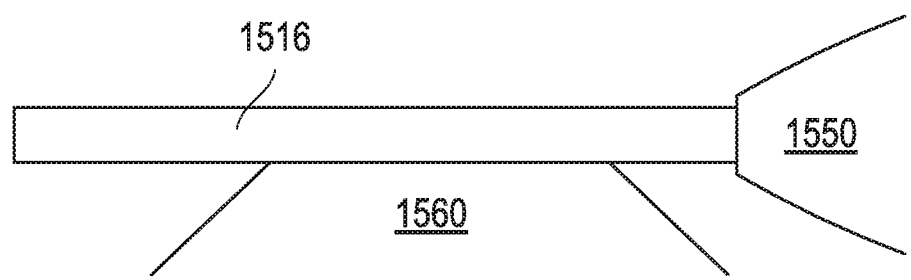
Figure 11:
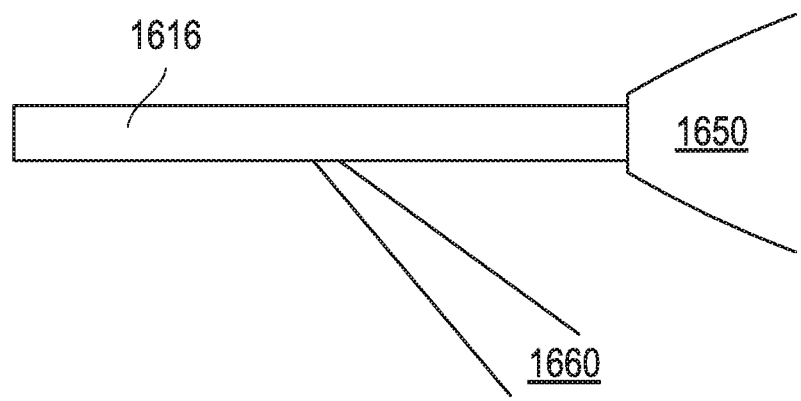

Thus, in addition to the first light source 1222, 1223 and the second light source 1235, the lamp unit 1210 includes the third light source 1212, 1213. FIG. 10 and FIG. 11 illustrate light cones decoupled from the first and third light sources 1222, 1223 and 1212, 1213.

Referring to FIG. 10, a multifunction lamp unit 1516 emits light rays along its lens in analogy to the lamp unit 1416 of FIG. 9. The respective light rays are not shown in FIG. 10. FIG. 10 rather serves to explains light decoupled from two light conductors as the two light conductors 1214 and 1224 of FIG. 7. In fact, the first light conductor 1224 guides all light to one end of the lamp unit 1516 such that there is a light cone 1550, whereas the second light conductor 1214 decouples light along its extension such that there is a light cone 1560 as shown in FIG. 10.

Referring to FIG. 10, each of the light cones 1550 and 1560 as well as the light rays emitted from the light foil can fulfill different functions. For example, the light cone 1550 could be used as a turn signal, whereas the light cone 1560 could be used as an approach light and the light rays emitted from the light foil could have decorative purposes.

Figure 12:
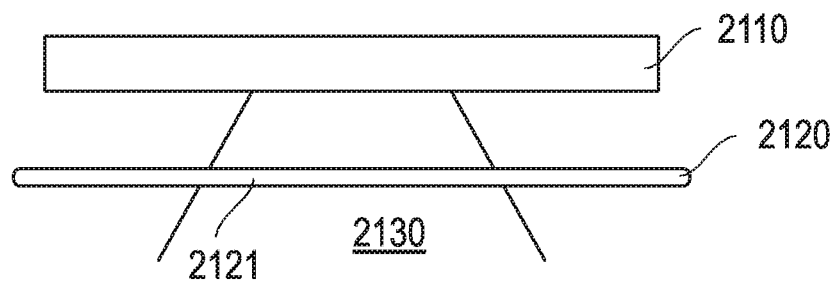
Figure 13:
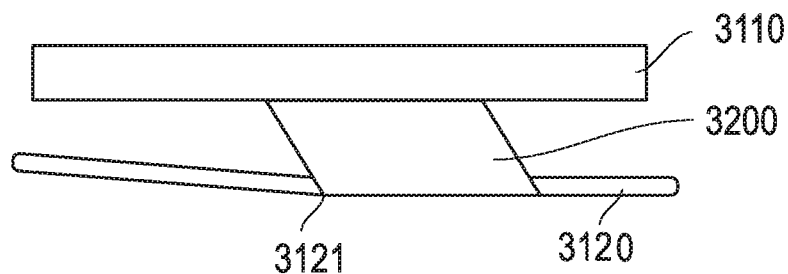

Further possibilities of light emissions from multifunctional lamp units of the invention are shown in FIGS. 11 to 13. Those examples are not restricted to the ones illustrated. There are many more possibilities which lie within the knowledge of a person having ordinary skill in the art.

In the example shown in FIG. 11, which is providing a slight alternative to the one of FIG. 10, a lamp unit 1616 is provided with two light sources each including a printed circuit board and an LED as well as a light guide such that the light cones 1650, 1660 can be decoupled into selected directions. The directions of the light cones 1650, 1660 depend on the functions to be fulfilled. In addition a light foil can be used to emit light ray homogeneously along the lens, although not shown.

FIG. 12 shows a lamp unit 2110 which is installed within a rear view device, e.g. an exterior mirror. A covering device 2120 of the rear view device is shown to overlap one side of the lamp unit 2110, which can be the underside. The covering device 2120 is provided with a transparent region 2121 through which a light cone 2130 can be emitted on the ground in order to provide a puddle light function. The light cone 2130 could come from a specially oriented third light source and/or light conductor.

The example of FIG. 13 shows another lamp unit 3110 arranged within a rear view device, e.g. a camera port, having a covering device 3120 with an opening 3121. A light conductor 3200 is extending from the lamp unit 3110 towards the opening 3121 within the covering device 3120 such that light can be guided into a specific direction to fulfill a specific function which could be the function of a logo lamp.

The rearview device can also be equipped with different illumination devices.

Covering devices having the structures and arrangements illustrated in FIG. 14-26 are generally known in the prior art; however, such structures and arrangements lack the properties of covering devices, as described above in referenced with FIGS. 1-13. For example, the covering devices may be formed from a polymeric substrate and may include at least one light conditioning area configured to be used for tinting, dying, reflecting, or scattering light by using at least one additive for the polymeric substrate, among other properties and characteristics of the covering devices described in reference with FIGS. 1-13.

Figure 14:
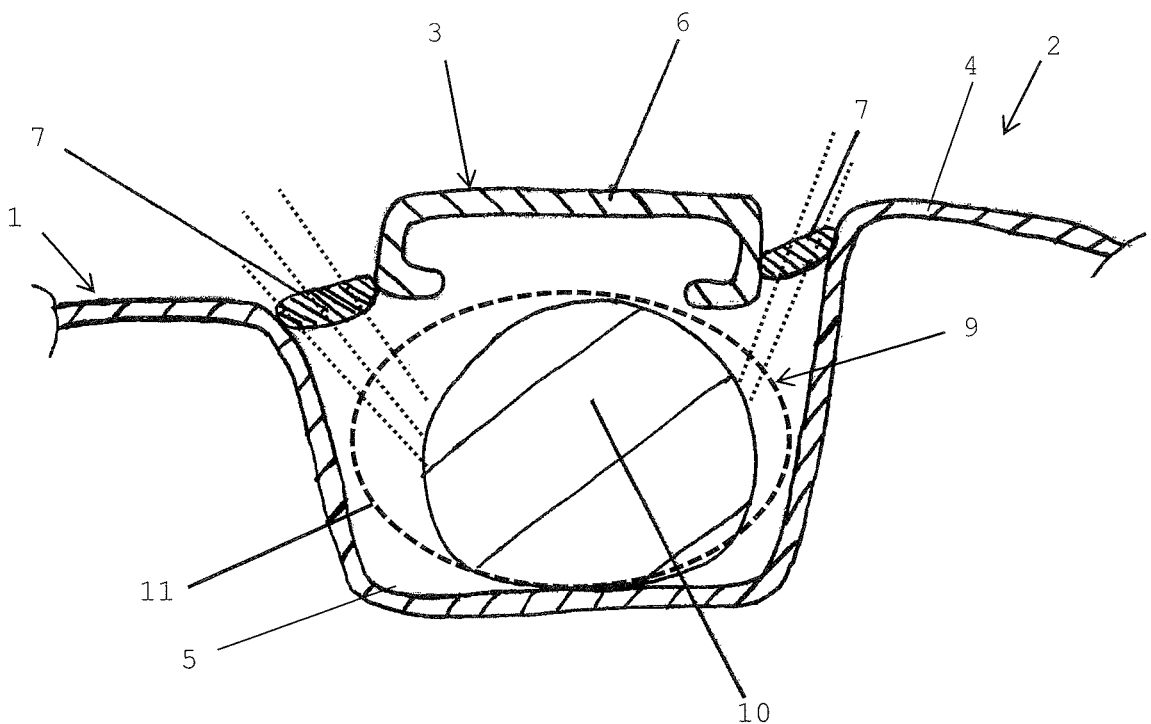
FIG. 14 is a cutaway view of a portion of an example of a body component and a covering device.

FIG. 14 is a highly simplified and purely schematic cross-sectional view of an example of a first body component 1 of a vehicle 2, which is provided with a covering device 3. The fixing of such a covering device to the body component or body components is generally known and is not shown in FIG. 14 for reasons of clarity. The same applies to FIG. 15 below.

Figure 16:
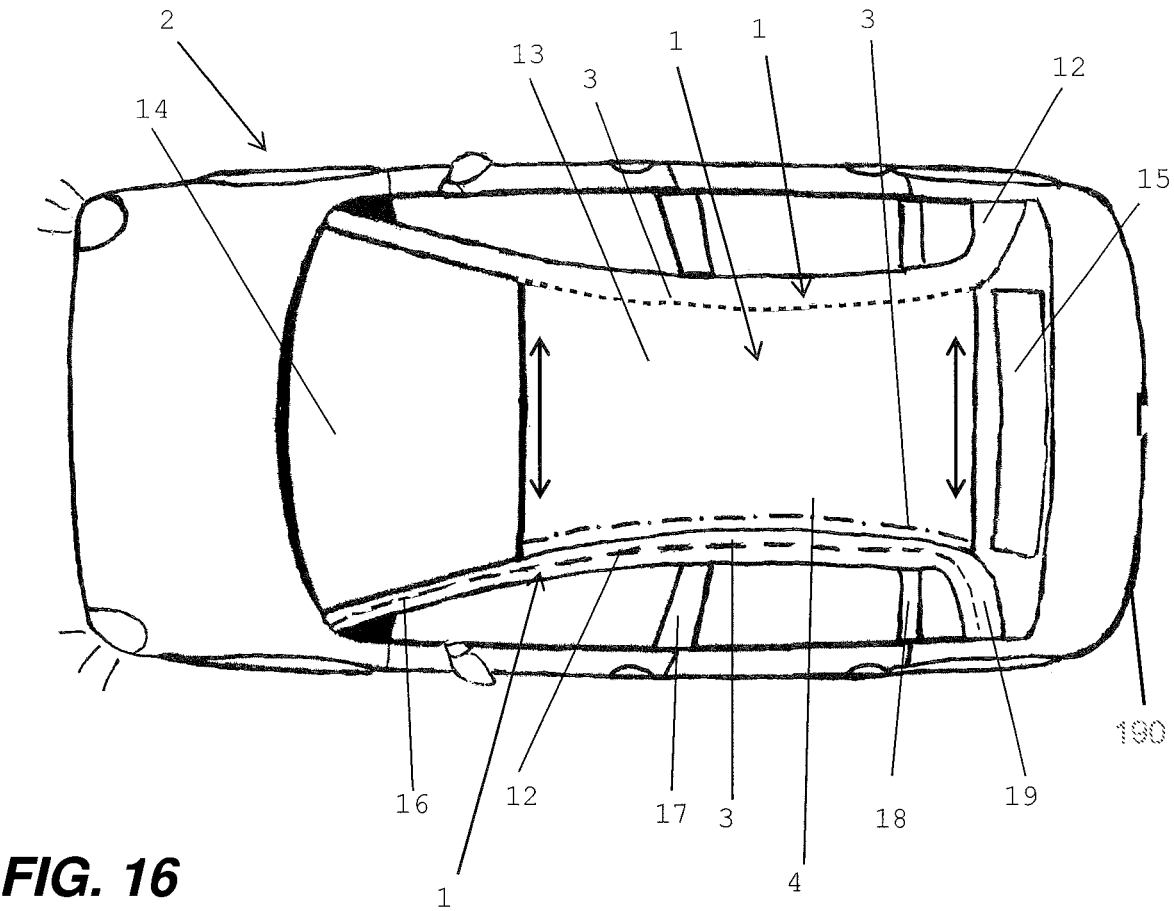
FIG. 16 is a top view of an example of a vehicle with different variants for the positioning of a covering device.
Figure 17:
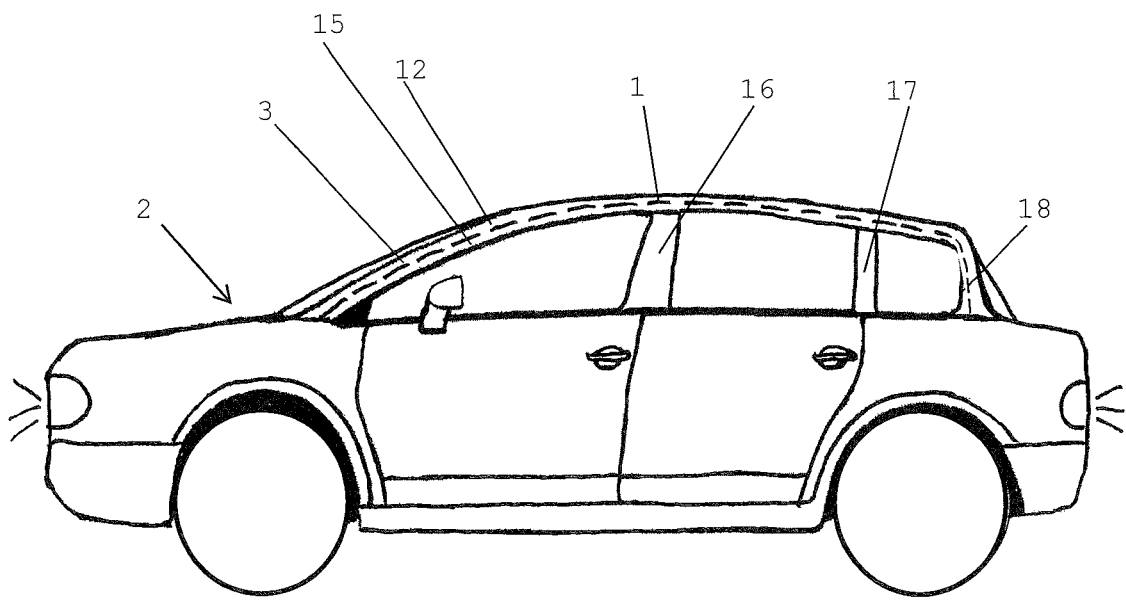
FIG. 17 is a side view of the vehicle according to FIG. 16.

In the example shown in FIG. 14, the body component 1 is a roof panel 4, but instead of a roof panel 4 it can likewise be a side panel or any other body or vehicle component which can be provided with at least one covering device, as is illustrated in FIGS. 17 and 18 below. For example, the body component 1 may also be a vehicle component such as a rearview device or a lamp such as the lamp 110, 100, 1110, 1210, or any of the other lamp units for use with a rearview device such as described in the context of FIGS. 1-13. In addition, the covering devices 160, 600, 1120, 1250, 1336, 2120, and 3120 described in the context of FIGS. 1-13 may be replaced by a covering device 3, as described throughout FIGS. 14-26. Further, all features described for the covering devices 160, 600, 1120, 1250, 1336, 2120, and 3120 may be applied to the covering device 3 of FIGS. 14-26, as referenced below, including all materials, coatings, and other features described above.

The panels mentioned with reference to FIG. 14 and in FIG. 15-26 below, such as the side panel, door panel, tailgate panel, wing panel, bonnet panel, front apron panel, rear apron panel, bumper panel, etc., can be metal panels but also, for example, plastics panels, fibre-reinforced plastics panels, etc. or a combination of metal, plastics and/or fibre-reinforced plastics panels, etc. The invention is not limited to metal, plastics and fibre-reinforced plastics panels and combinations thereof.

Figure 15:
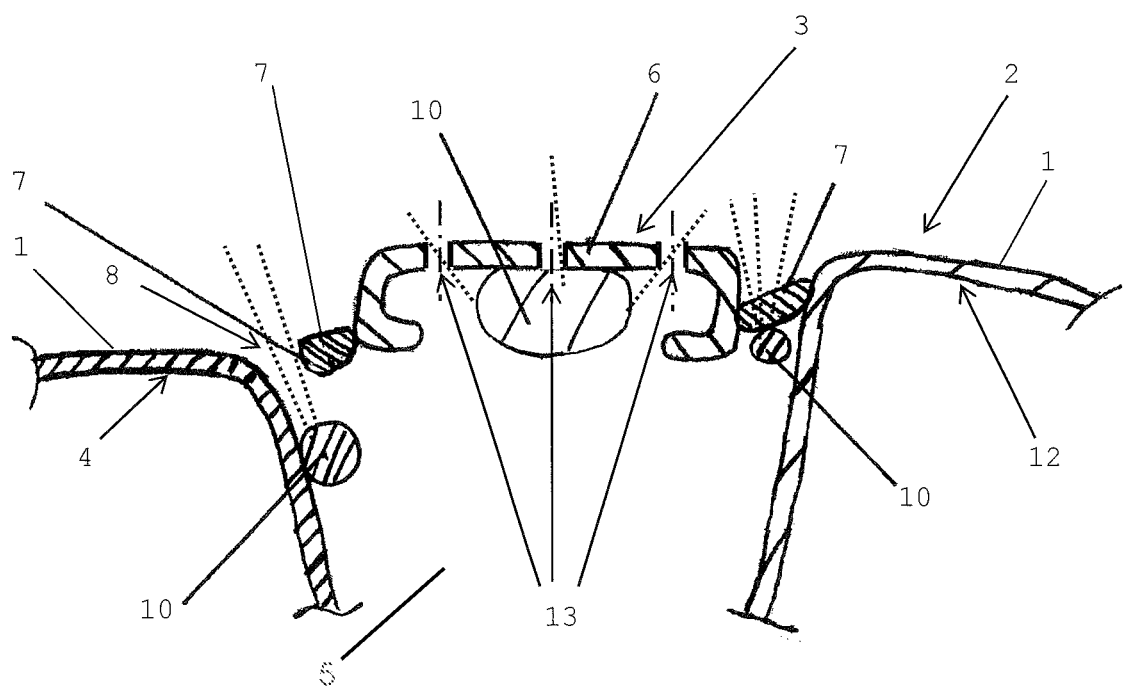
FIG. 15 is a cutaway view of a portion of an example of two adjacent body components and a covering device.

As is shown in the cutaway view in FIG. 14, the body component 1 has a recess 5, for example a joint as is shown in FIG. 14 or a recess 5 as is shown in FIG. 15. The width of the recess 5 is covered at least in part or completely by the covering device 3 having a strip or cap element 6. The strip or cap element 6 is connected on at least one side or, as is shown in the example in FIG. 14, on both sides to at least one lip element 7. The lip element 7 is integral with the strip or cap element 6 or is fixed thereto as a separate part. In the fitted state, the lip element 7 rests on the body component 1, as is shown in FIG. 14, or it forms a gap 8 or joint gap with the body component 1, as is shown in the example in FIG. 15.

The strip or cap element 6 and/or at least one lip element 7 is or are designed so that light can shine through. To that end, the strip or cap element 6 or the lip element 7 is transparent, partially transparent or translucent or alternatively is opaque and has at least one opening 13, as is shown in FIG. 15. When the lip element 7 or the strip or cap element 6 is transparent, partially transparent or translucent, the lip element 7 or the cap element 6 is made of a transparent, partially transparent or translucent material, for example a transparent, partially transparent or translucent plastics material. The strip or cap element 6 and/or at least one lip element 7 can be produced from the at least partially transparent or translucent plastics material by means of extrusion, for example.

Provided that at least one opening 13 or gap 8 is provided in the strip or cap element 6 or lip element 7 for light to shine through, the strip or cap element 6 or the lip element 7 can also be made of an opaque material, for example metal or an opaque plastics material, as is shown in the following example in FIG. 15. Because light can shine through the covering device 3, it can serve, together with a light source 10 as position lighting, so that a driver is more easily able to locate the vehicle, for example at night on an unlit car park.

The covering device 3 further has a lighting device 9 or can be coupled to an already existing lighting device 9, for example. The lighting device 9 has at least one light source 10 and/or at least one afterglow pigment or phosphorescent pigment. Afterglow pigments or phosphorescent pigments glow after they have been irradiated with visible light. This property can be used to produce inks which glow in the dark, which must previously be charged by irradiation with light. For example, phosphorescent pigments based on alkaline earth aluminates, for example strontium aluminate, or zinc sulfide pigments can be used. Afterglow inks, afterglow paints, afterglow foils, etc. are produced using such afterglow pigments or phosphorescent pigments. The afterglow pigment or phosphorescent pigment can be mixed, for example, with the material for the strip or cap element 6 or lip element 7.

It is likewise possible to use afterglow inks, afterglow foils or afterglow paints and to coat the strip or cap element 6 and/or at least one lip element 7 therewith on its front side and/or outside.

The lighting device 9 can additionally have at least one light guide 11 for guiding the light of the at least one light source 9. The light guide 11 and the light source 9 are shown in highly simplified form in FIG. 14.

The additional light guide 11 is shown in FIG. 14 by a broken line. As described above, the at least one afterglow pigment or phosphorescent pigment is introduced into the material for the lip element 7 or strip or cap element 6, or the lip element 7 or strip or cap element 6 is coated with, for example, an afterglow ink, an afterglow foil or an afterglow paint. However, the invention is not limited to afterglow inks, afterglow foils, afterglow paints or the mixing of afterglow pigments with the material of the covering device; these are merely examples for making the covering device phosphorescent. The afterglow pigment or phosphorescent pigment has the advantage that long-lasting illumination of the covering device 3 in the dark is possible without an additional light source, such as an LED.

The lighting device 9 can contain as the light source 10, for example, a light-emitting diode (LED), an organic light-emitting diode (OLED), an electroluminescent foil (EL foil), a filament lamp, a halogen lamp, a gas discharge lamp, a laser, etc. In addition to the mentioned examples of a light source 10, however, another light source, which is suitable for being integrated into a body component 1 and for shining through a covering device 3, can also be provided, the light source withstanding operation of the vehicle. The light source 10 can generate, for example, white light or colored light, depending on the function and intended use. For example, colored LEDs as light sources 10 allow the covering device 3 also to be illuminated in color. This applies to all examples.

As an additional light guide 11, the lighting device 9 can have, for example, a light-guiding foil, a light-guiding fabric or an elongate light guide. Where there is a plurality of light guides 11, they can be in the form of, for example, optical waveguides, fiber optic cables or glass fiber cables. Furthermore, the light guide 11 can be, for example, rigid or flexible. The invention is not limited to the mentioned examples of light guides 11.

The light source 10 and/or the light guide 11 can be integral with the strip or cap element 6 and/or the lip element 7. In another example, the light guide 11 can be coupled with the strip or cap element 6 and/or the lip element 7 as a separate component.

As is shown in FIG. 14, the light source 10 is arranged in the recess 5, in this case the joint, in the body component 1 on the rear side of the strip or cap element 6 and the two lip elements 7. In the example shown in FIG. 14, the two lip elements 7 are, for example, transparent, whereas the strip or cap element 6 is opaque. In another example of FIG. 14, the strip or cap element 6 is, for example, a metal strip to which the two transparent lip elements 7 of plastics material are fixed. The lip elements 7 are fixed to the strip or cap element 6, for example injection molded, interlocked, clamped, inserted, introduced, screwed, bolted, riveted and/or adhesively bonded, etc. The invention is not limited to the mentioned fixing methods for fixing a lip element 7 to the strip or cap element 6. Any other fixing method which is suitable for fixing the lip element 7 to the strip or cap element 6 can be used.

For example, the strip or cap element 6, for example in the form of a metal strip, can be in the form of an extruded aluminum section with inserted lip elements 7. The strip or cap element 7 can likewise be an injection molded part or an extruded part. Furthermore, the strip or cap element 6 and the respective lip element 7 can also be formed in one piece, for example from plastics material.

In the example shown in FIG. 14, the light source 10 shines through the transparent lip elements 7. Direct illumination, in this case of the lip elements 7, can thus be provided by means of the light source 10. The light beams of the light source 10 which have passed through the lip elements 7 to the outside are indicated in FIG. 14 by a dotted line. Where an additional light guide 11 is provided, as is indicated by a broken line in FIG. 14, indirect illumination can also be provided, in this case of the lip elements 7, by guiding the light from the light source 10 through the light guide 11 to the lip elements 7. As a result, it is also possible, for example, to illuminate lip elements 7 which are situated at a distance from the light source 10.

One or more additional openings, for example slots, through which the light of the light source 10 can pass, can optionally be provided in the opaque strip or cap element 6, as is shown in FIG. 15. In this manner, in addition to shining through the transparent lip elements 7, light from the lighting device 10 can also shine through the otherwise opaque strip or cap element 6 in the example in FIG. 14. The opaque strip or cap element can likewise be coated on its outside with an afterglow ink, an afterglow foil or an afterglow paint.

As described above, the light source 10 and/or the light guide 11 can also be fixed to the strip or cap element 6 or the lip element 7 or can be integral therewith. As a result, the covering device 3 can be pre-assembled with the light source 10 and optionally the additional light guide 11 and fitted as a system.

In the case where the covering device 3 is coupled to a separate light source 10 and/or a separate light guide 11, as is shown in FIG. 14, an existing light source 10 and/or light guide 11, for example, can be retrofitted with the covering device 3.

FIG. 15 is a highly simplified and purely schematic cutaway view of two body components 1 of a vehicle 2 which are provided with a covering device 3 according to one example of the invention. One body component 1 in the example shown in FIG. 15 is a roof panel 4 and the other body component 1 is a side panel 12. The covering device 3 can accordingly be provided, as is shown in FIG. 16, between the roof panel 4 and the side panel 12 of a vehicle 2 and can extend, for example, from the windshield to the rear window or from the A-pillar to a B-pillar, a C-pillar or to a D-pillar of a vehicle.

However, instead of the combination of a roof panel 4 and a side panel 12, any other combination of body components 1 which can be provided with at least one covering device 3 can also be provided.

The example shown in FIG. 15 corresponds substantially to the example of the invention shown in FIG. 14, so that reference is made in this connection to the statements made with reference to FIG. 14, in order to avoid unnecessary repetition. The example shown in FIG. 15 differs from the example shown in FIG. 14 substantially in that the recess 5 which is covered by means of the covering device 3 is formed by two body components 1 in FIG. 15 instead of by one body component 1 in FIG. 14. The recess in FIG. 15 is in the form of, for example, a gap between the two body components in FIG. 15.

Furthermore, the covering device 3 in the example in FIG. 15 may form in the fitted state a gap 8 or joint gap between one of the lip elements 7 and the associated body component 1, which gap is illuminated by a light source 10. Moreover, in the example in FIG. 15, a further light source 10 is attached to the strip or cap element 6 and a further light source 10 is attached to a lip element 7. Furthermore, the strip or cap element 6 in the example in FIG. 15 has a plurality of additional openings 13 for light to shine through. The light beams which have passed from the light sources 10 through the lip elements 7, the gap 8 and the openings 13 to the outside are indicated in FIG. 15 by a dotted line.

As described above with reference to FIG. 14, at least one part of the covering device 3, that is to say at least the strip or cap element 6 and/or at least one lip element 7, is so designed that it can be illuminated. For the purpose of illumination, the strip or cap element 6 and/or at least one lip element 7 are made of an at least partially transparent or translucent material and are optionally additionally provided with at least one afterglow pigment or phosphorescent pigment. Likewise, for the purpose of illumination, the strip or cap element 6 and/or the at least one lip element 7 can also be made of an opaque material and be provided with at least one opening 13 for light to shine through, as is shown in FIG. 15.

In the example shown in FIG. 15, one lip element 7 rests in the fitted state on one body component 1, while the other lip element 7 forms a gap 8 or joint gap with the other body component 1. A light source 10 is arranged in the recess 5 formed by the two body components 1 and is optionally additionally fixed, for example adhesively bonded, etc., therein. The light source 10 shines through the gap 8 between the body component 1 and the lip element 7 to the outside. The lip element 7 is opaque. However, it can in principle also be made of an at least partially transparent or translucent material or can be omitted altogether.

Furthermore, there may be provided on the rear side of the other lip element 7 a light source 10 or at least one light guide (not shown) connected to a light source, for shining light through the at least partially transparent or translucent lip element 7. There may optionally additionally be provided at least one light guide which guides the light of the light source 10 in the longitudinal direction of the lip element 7 in order, for example, to illuminate or shine through regions of the lip element 7 that are at a distance from the light source 10. Instead of being made of an at least partially transparent or translucent material, the lip element 7 can also be made of an opaque material, for example an opaque plastics material. In the case of lip element 7 being opaque, lip element 7 has at least one opening (not shown) in order to be illuminated or for light to shine through.

Furthermore, as is shown in the example in FIG. 15, a light source 10 or at least one light guide (not shown) connected to a light source can be provided on the rear side of the strip or cap element 6, for illuminating the strip or cap element 6. In the example in FIG. 15, the strip or cap element 6 is made, for example, of an opaque material, for example in the form of an extruded metal profile. For illuminating the strip or cap element 6, the strip or cap element 6 has at least one opening or, as shown in FIG. 15, a plurality of openings 13 for light to shine through.

In the example in FIG. 15, the light source 10 and/or the at least one light guide are fixed to the associated strip or cap element 6 or to the associated lip element 7, for example by adhesive bonding, etc. Adhesive bonding is, however, merely an example of a large number of fixing methods for fixing the light source 10 or the light guide to the covering device 3. The invention is not limited to the mentioned example. Any other fixing method can be used for fixing the light source 10 or the light guide to the covering device 3. Furthermore, the light source 10 or the light guide, if they are already present, for example, can also be coupled to the covering device 3, as is shown in FIG. 14 and/or at least one lip element 7 as shown in FIG. 15.

FIG. 16 is a top view of a vehicle 2 with different variants for the positioning of a covering device 3 according to one example of the invention. The diagram in FIG. 16 is highly simplified and purely schematic. The variants show in particular possibilities for illuminating the outline of the vehicle by means of the illuminated covering device and, for example, facilitating the location of a parked vehicle in the dark.

As has been described above with reference to the example of FIG. 14, a covering device 3 can be arranged in a recess or joint in a body component 1 and can have a lighting device or be coupled to a lighting device.

In a first variant, the covering device 3 can be provided in the roof panel 4 as a body component 1 for covering a recess in the roof panel 4. The run of the covering device 3 in the recess in the roof panel 4 is indicated in FIG. 16 by a dot-and-dash line. The covering device 3 runs in the longitudinal direction of the roof panel 4 along the recess and can extend over at least part of the length or over the entire length of the roof panel 4, as is indicated in FIG. 16. A covering device (not shown) can likewise extend also in the transverse direction of the roof panel 4 along a recess, for example over at least part of the width or over the entire width of the windshield 14 or the rear window 15, as is indicated by double-headed arrows in FIG. 16.

In a second variant, the covering device 3 can be provided in a side panel 12 as a body component 1, for covering a recess in the side panel 12. The run of the covering device 3 in the recess in the side panel 12 is indicated in FIG. 16 by a broken line and is comparable to the example as is shown in FIG. 14. The covering device 3 can extend over at least part of the length or over the entire length of the side panel 12 from the windshield 14 to the rear window 15 or from the A-pillar 16 via the B-pillar 17 and the C-pillar 18 to the D-pillar 19 of the vehicle 2 and to the tailgate 190, as is shown in FIG. 16.

According to a third variant, the covering device 3 can be provided in a recess or gap between the roof panel 4 as a body component 1 and a side panel 12 as a further body component 1, for covering the recess between the two body components 1. The run of the covering device 3 in the recess between the roof panel 4 and the side panel 12 is indicated in FIG. 16 by a dotted line and is shown above in the example in FIG. 15.

The covering device 3 can extend, for example, along at least part of the length or over the entire length of the roof panel 4, as is shown in the example in FIG. 16, or of the side panel 12.

The invention is not limited to the three variants shown for body components 1 for providing with the covering device 3. Furthermore, instead of one covering device 3, it is also possible to provide at least two successive covering devices. Likewise, a covering device 3 can have along its length, on at least one side, at least two successive lip elements instead of a continuous lip element. This applies to all the examples of the invention.

FIG. 17 is a side view of the vehicle 2 according to FIG. 16. FIG. 17 shows the run of the covering device 3 along the recess in the side panel 12 by a broken line. The covering device 3 runs in FIG. 17 from the A-pillar 16 via the B-pillar 17 and the C-pillar 18 to the D-pillar 19 of the vehicle 2. The covering device 3 can extend over the length of the D-pillar to the tailgate.

FIG. 18 is a highly simplified and purely schematic cutaway view of a portion of two adjacent body components 1 and a covering device 3 according to a further example of the invention. The example according to FIG. 18 has substantially the same construction as the examples described above with reference to FIG. 14-17, so that reference is made in this connection to the description of FIG. 14-17, in order to avoid unnecessary repetition.

In the example shown in FIG. 18, at least one light guide 11 is integrated into the covering device 3 and is, for example, integral or formed in one piece with the covering device 3, as has been described above as a variant with reference to FIG. 14.

Instead of the one light guide 11, a plurality of light guides 11 can likewise be integrated into the covering device 3. In FIG. 18 and in FIG. 19-26, there is used as the light guide 11 in particular an elongate light guide 11, for example a glass fibre or, where there are a plurality of light guides 11, a glass fibre cable. In principle, however, a light-guiding foil and/or a light-guiding fabric, for example, can also be provided as the light guide 11.

The at least one light guide 11 of the covering device 3 in FIG. 18 is, as in FIG. 19-26, coupled to at least one lighting device 9 (not shown), for example a lighting device 9 that is already present in a vehicle. In addition or alternatively, the covering device 3 can have at least one lighting device 9 of its own which is coupled to the at least one light guide 11.

The lighting device 9 has at least one light source 10 and/or at least one afterglow pigment, phosphorescent pigment and/or fluorescent pigment, as has already been described above. This applies to all the examples of the invention. As described above, the light source 10 can be, for example, at least one light-emitting diode (LED), an organic light-emitting diode (OLED), an electroluminescent foil (EL foil), a filament lamp, a halogen lamp, a gas discharge lamp and/or a laser, etc.

In the example shown in FIG. 18, the at least one light guide 11 is, for example, integrated into at least one lip element 7 on one side of the covering device 3.

In addition or alternatively, at least one light guide 11 can likewise also be integrated into the strip or cap element 6, as is indicated in FIG. 18 by a broken line. In this case, the at least one lip element 7 may also be omitted or left out if required. This applies to all the examples of the invention.

The lip element 7 and/or the strip or cap element 6 in FIG. 18, and in FIGS. 19-26 below, can be made entirely of an at least partially transparent or translucent material, for example at least one at least partially transparent or translucent plastics material, in which the at least one light guide 11 is integrated. The at least partially transparent or translucent material may optionally additionally be colored at least in one region or completely in order to provide colored lighting or illumination of the covering device 3 in that region. In addition or alternatively, the at least partially transparent or translucent material can optionally also additionally be provided with a colored coating which light can shine through or with a colored foil which light can shine through. The partially transparent or translucent material can, for example, be such that it is visually non-transparent but light can shine through, so that the covering device can outwardly light up in color in the region of the partially transparent or translucent material. For example, the at least partially transparent or translucent material can be a chromium-based reflective coating which is translucent, as described in U.S. patent application Ser. No. 14/936,024, which is incorporated herein by reference in its entirety. In addition or alternatively, a colored light source 10 can likewise be used, for example a colored LED, for example a red, green or blue LED, etc. This applies to all the examples of the invention.

With respect to the chromium-based reflective coating, the chromium-based reflective coating may be an alloy of chromium and a material, the dopant material being selected from hexagonally close-packed transition metals, and the alloy having a crystal structure of a primary body-centered cubic phase in coexistence with a secondary omega hexagonally close-packed phase. The alloy may be a binary alloy of chromium and the dopant material. An atomic percentage of the dopant material in the alloy may range from about 1.9 at. % to about 5.8 at. %. The dopant material may be selected from hexagonally close-packed transition metals zirconium, titanium, cobalt, hafnium, rubidium, yttrium and osmium. In another example, the dopant material may be selected from hexagonally close-packed transition metals zirconium, titanium and cobalt. The alloy may be a binary alloy and the dopant material may be zirconium, and an atomic percentage of the zirconium in the binary alloy may range from about 4.5 at. % to about 5.8 at. %. The alloy may be a binary alloy and the dopant material may be titanium, where an atomic percentage of the titanium in the binary alloy ranges from about 1.9 at. % to about 5.8 at. %. The alloy may be a binary alloy and the dopant material may be cobalt, where an atomic percentage of the cobalt in the binary alloy ranges from about 1.9 at. % to 5.7 at. %.

Referring back to the examples of FIGS. 18-26, the lip element 7 and/or the strip or cap element 6 can be made of an opaque material, for example at least one opaque plastics material and/or metal, etc., and at least in the region of the at least one light guide 11 can be made of an at least partially transparent or translucent material, for example at least one at least partially transparent or translucent plastics material. The at least partially transparent or translucent material can thereby additionally be colored, provided with a colored foil, coated with a colored layer which light can shine through and/or illuminated by means of at least one colored light source, as described above, in order to provide colored illumination of the covering device 3. This applies to all the examples of the invention.

The light guide 11 can, for example, be extruded or injection molded into the lip element 7 and/or the strip or cap element 6 and/or inserted or threaded into a cavity in the lip element 7 and/or strip or cap element 6, as is indicated for the lip element 7 by way of example in FIG. 19 by means of a broken line.

In the example in FIG. 18, the covering device 3 with the at least one light guide 11 integrated into the covering device 3 is arranged between two adjacent body components 1, for example a roof panel 4 and the side panel 12. The two adjacent body components 1 form a recess 5, for example a gap or joint gap, which is covered at least in part by the covering device 3 in the fitted state.

In the example in FIG. 18, the at least one lip element 7 on one side of the covering device 3 rests on the opposite body component 1. The lip element 7 can likewise form a gap or joint gap with the body component 1, as is shown above in the example in FIG. 15.

Instead of being arranged in a recess 5 between two adjacent body components 1, the covering device 3 with the at least one light guide 11 integrated into the covering device 3 can also be provided in a recess 5 in a body component 1, such as, for example, a roof channel of a roof panel 4, for covering the recess 5 at least in part in the fitted state, as is shown above by way of example in FIG. 15. Moreover, the covering device 3 with the at least one integrated light guide 11 can also be provided on a flat, curved or stepped region of a body component, as is shown by way of example in FIGS. 21 and 22 below, in order to illuminate that region.

FIG. 19 is a highly simplified and purely schematic cross-sectional view of a portion of a covering device 3 with at least one light guide 11 integrated therein.

In the example shown in FIG. 19, the covering device 3 is, for example, formed in one piece or integral with the at least one light guide 11.

The strip or cap element 6 and the at least one lip element 7 are thereby in the form of, for example, an extruded part made from at least one plastics material. The at least one light guide 11 is extruded into the lip element 7 in FIG. 18. The at least one light guide 11 or at least one further additional light guide 11 can likewise also be extruded into the strip or cap element 6 (not shown).

As is indicated by a broken line in FIG. 19, the lip element 7 can also have, for example, a tubular cavity in its longitudinal direction, into which the at least one light guide 11 is inserted. The cavity is open, for example, at least at one end or at both ends of the lip element 7 and, if required, can be closed by means of a closing element (not shown), for example a rubber stopper, etc.

Instead of being integral or formed in one piece with the lip element 7, the at least one light guide 11 can also be integral or formed in one piece with the strip or cap element 6 of the covering device 3 and, for example, be extruded into the strip or cap element.

In a further example, which is not shown, at least one light guide is integrated in at least one lip element 7 and at least one light guide is integrated in the strip or cap element 6. The respective light guide is, for example, extruded into the lip element 7 and/or the strip or cap element 6.

FIG. 20 is a highly simplified and purely schematic cross-sectional view of a portion of another covering device 3 with a light guide 11 integrated therein. The at least one light guide 11 is, for example, integrated into the lip element 7 of the covering device 3, for example extruded into the lip element, inserted into a cavity in the lip element, etc.

Furthermore, in the example shown in FIG. 20, the lip element 7 is fixed as a separate part to the strip or cap element 6. As a result, the lip element 7 and the strip or cap element 6 can not only be made of the same material or of the same material combination but can also very easily be made of different materials or different material combinations. Depending on whether the at least one light guide 11 is integrated into the lip element 7 or into the strip or cap element 6, that part can be made, for example, of plastics material and the other part, which does not have an integrated light guide, can be made, for example, of metal, for example in the form of a metal sheet or a cast metal part, etc., of rubber and/or of a different plastics material, etc.

The strip or cap element 6 has a holder 20 for receiving and holding a fixing portion 22 of the lip element 7. As is shown in FIG. 20, the holder 20 is, for example, in the form of a groove 21 with an undercut. The groove 21 with the undercut extends, for example, in the longitudinal direction of the strip or cap element 6 in FIG. 20 and is open at least at one end for the introduction or insertion of the fixing portion 22 of the lip element 7.

In the example as is shown in FIG. 20, the groove 21 has a square cross section for receiving the corresponding fixing portion 22, which likewise has a square cross section. The groove 21, and accordingly the fixing portion 22 of the lip element 7, can have any desired cross section, for example a round, oval and/or angular cross section, etc.

The holder 20 of the strip or cap element 6 and the fixing portion 22 of the lip element 7 can likewise also be of such a form that the lip element 7 can be engaged and/or clamped in the holder 20 with its fixing portion 22. This applies to all the examples of the invention.

In addition or alternatively to the fixing possibilities mentioned above, the lip element 7 can also be in such a form that it can be adhesively bonded, screwed, bolted, welded, etc. to the strip or cap element 6. This likewise applies to all the examples of the invention.

FIG. 21 is a highly simplified and purely schematic cross-sectional view of a portion of an arrangement of a covering device 3 according to the invention on a curved portion of a body component 1. The body component 1 in the example in FIG. 21 is, for example, a door panel 23. In the case of the door panel 23, the covering device 3 can, if required, be provided as or have the form of an impact protector or impact protection element. To that end, the strip or cap element 6 of the covering device 3 can be formed, for example, with a reinforcing structure, suitable dimensions, a suitable material or material combination, etc. The impact protection element thereby forms a functional element.

The covering device 3 is fixed to the curved portion of the body component 1 in a conventional manner generally known to a person skilled in the art. The fixing of the covering device 3 is not shown for reasons of clarity. In the example shown in FIG. 21, at least one additional lip element 7 is optionally provided on the strip or cap element 6 of the covering device 3 on at least one side. The at least one lip element 7 is fixed, for example molded, to the strip or cap element, as has been described above, for example, with reference to FIG. 19, or is fixed to the strip or cap element 6 as a separate component, as has been described above, for example, with reference to FIG. 20.

In the example in FIG. 21, the at least one light guide 11 is integrated in, for example extruded into, the lip element 7. The at least one light guide 11 or at least one further additional light guide 11 can likewise also be integrated in, for example, extruded into, etc., the strip or cap element 6.

In the example in FIG. 21, the lip element 7 is so provided that it rests on the body component 1. The lip element with the light guide 11 integrated therein can likewise also form a gap with the body component 1, according to the function and intended use.

Furthermore, instead of being provided on a curved portion, the covering device 3 described with reference to FIG. 21 can also correspondingly be provided on a flat or planar portion of a body component 1. This applies to all the examples of the invention.

FIG. 22 is a highly simplified and purely schematic cross-sectional view of an arrangement of a covering device 3 according to the invention on a stepped portion of a body component 1. The body component 1 having the stepped portion is, for example, a tailgate panel 24.

The covering device 3 is thereby in the form of, for example, an illuminated handle strip, as is indicated in FIG. 22. The fixing of the covering device 3 to the tailgate panel is not shown in FIG. 22 for reasons of clarity. The fixing of such covering devices 3 is, however, generally known to a person skilled in the art.

Figure 24:
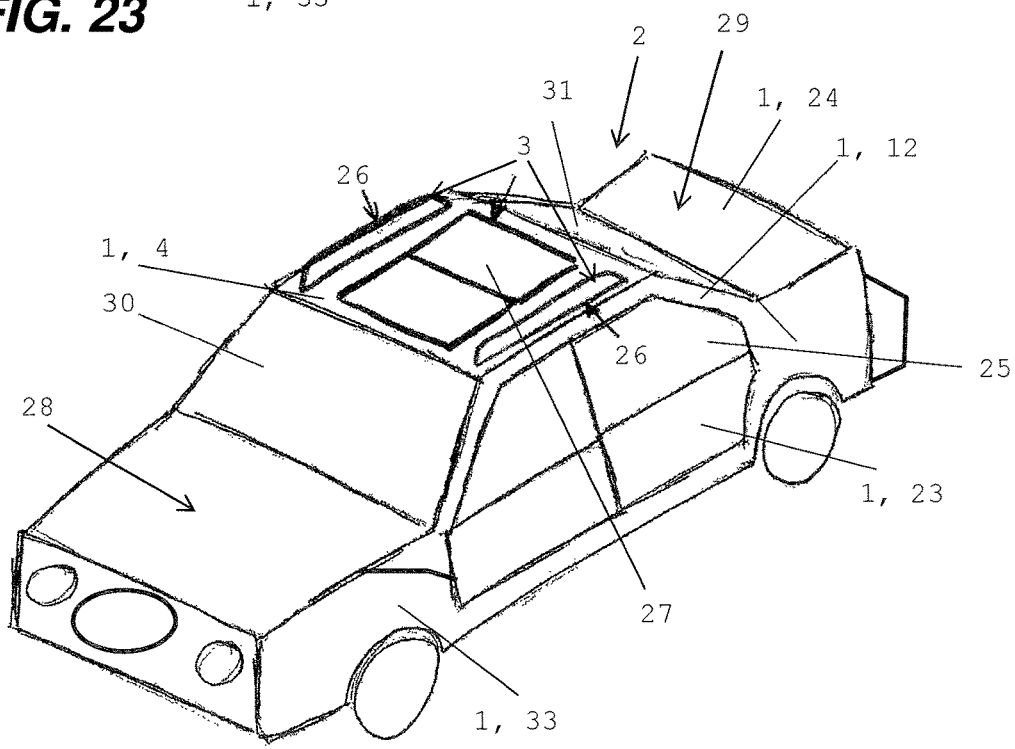
FIG. 24 is a perspective view of another example of a vehicle with further variants for the positioning of a covering device.
Figure 25:
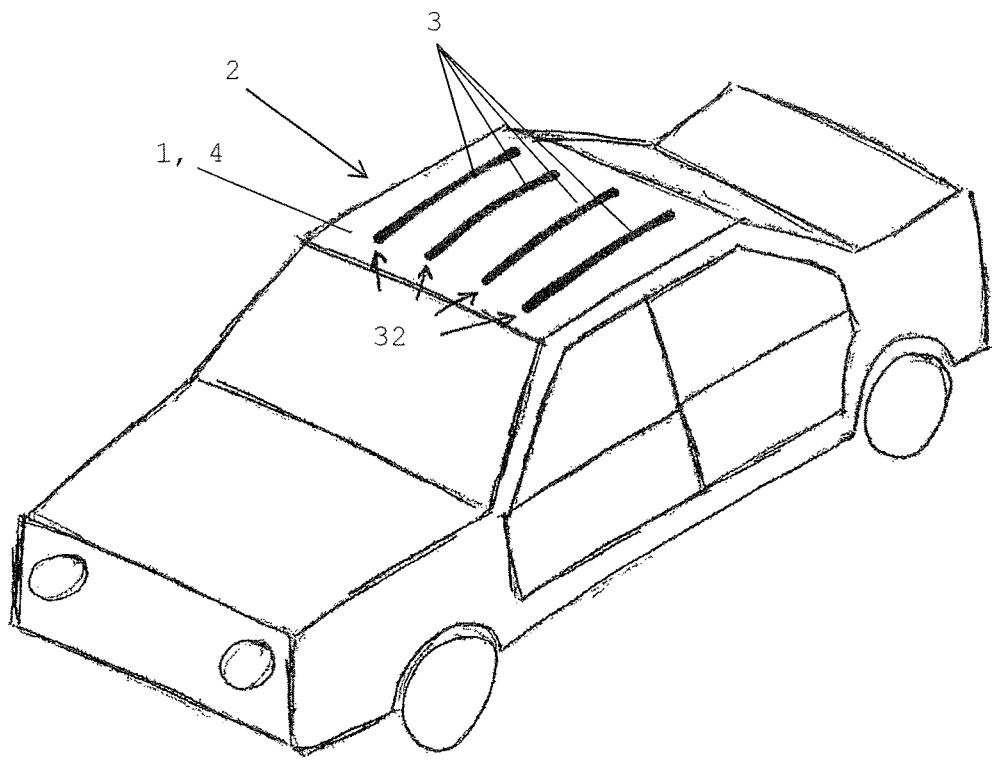
FIG. 25 is a perspective view of an example of a vehicle with further variants for the positioning of a covering device.
Figure 26:
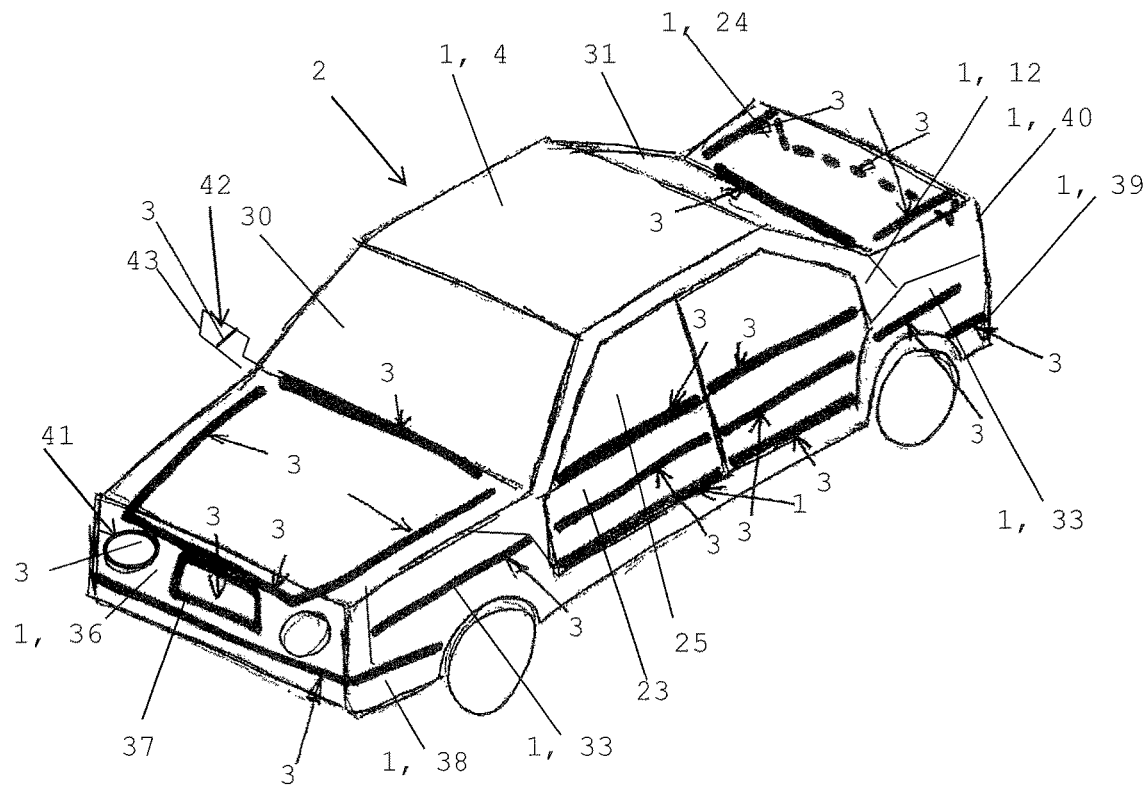
FIG. 26 is a perspective view of another example of a vehicle with different variants for the positioning of a covering device.

The covering device 3 can likewise also be arranged between a handle strip and the stepped tailgate panel 24 or between the stepped tailgate panel 24 and a vehicle number plate (not shown). However, the invention is not limited to the examples mentioned. Examples of the arrangement of a covering device 3 according to the invention on various body components 1 having, for example, curved portions, stepped portions, gaps, recesses, etc. are shown in FIGS. 24 to 26 below.

As above in FIG. 21, for example, the covering device 3 in FIG. 22 has a strip or cap element 6 which is attached to the stepped portion of the body component 1 in a conventional manner generally known to a person skilled in the art. On at least one side of the strip or cap element 6, for example adjacent a step of the body component 1, at least one additional lip element 7 is optionally provided and molded onto the strip or cap element, for example, as shown above in FIGS. 19 and 21, for example. The lip element 7 can likewise also be provided as a separate component fixed to the strip or cap element 6, as shown above in FIG. 20, for example.

In the example in FIG. 22, at least one light guide 11 is integrated in, for example extruded into, the lip element 7. The at least one light guide 11 or at least one further additional light guide 11 can likewise also be integrated in the strip or cap element 6, for example extruded or inserted into the lip element, as has been indicated above in FIG. 19 by means of a broken line. The lip element 7 can rest on the opposite body component 1 or can form a gap (not shown) therewith.

Figure 23:
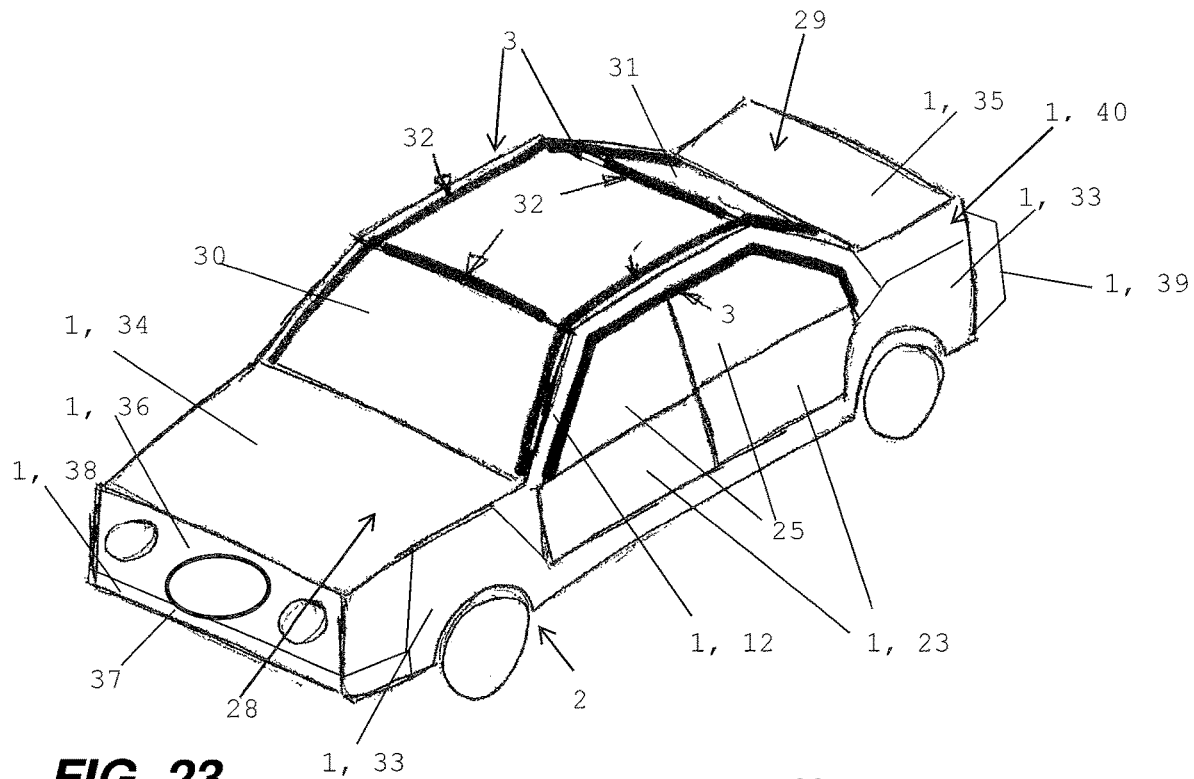
FIG. 23 is a perspective view of an example of a vehicle with different variants for the positioning of a covering device.

FIG. 23 is a highly simplified and purely schematic perspective view of a vehicle with different variants for the positioning of a covering device 3. There is used thereby, for example, a covering device 3 with at least one integrated light guide, as has been described above by way of example with reference to FIG. 18-22. However, a covering device as described above with reference to FIG. 14-17 can likewise be used. This applies to all the examples of the invention and in particular to the following examples described with reference to FIG. 24-26.

In FIG. 23, in a first variant, a covering device 3 with at least one integrated light guide is provided, for example, as a decorative element in the form of a roof strip or as a functional element in the form of a protective roof strip 32, for example in a recess in the roof panel 4 as an example of a body component 1. Such a first variant has been described above with reference to FIG. 16 and is indicated in FIG. 16 by means of a dot-and-dash line and also by means of double-headed arrows. The covering device 3 in the roof panel 4 can be provided in the longitudinal and/or transverse direction of the roof panel 4 in FIG. 23 and in particular circumferentially around a portion or the entirety of the roof panel 4. At least one covering device 3 is arranged along the recess in the roof panel 4. The covering device 3 runs along at least part of the length or along the entire length of the recess in the roof panel 4. In this manner, it is possible, for example, to illuminate a portion or the entire outline of the roof panel 4 and, for example, to facilitate considerably the location of the vehicle in the dark, for example when a car park in which the vehicle is situated is viewed from above.

Instead of being provided on the roof panel 4, the covering device 3 in the form of a roof strip or protective roof strip 32 can additionally also be provided on a side panel 12 adjacent to the roof panel 4. The covering device can thereby likewise be received and fixed, for example, in a recess in the side panel 12, where present. In the fitted state, the covering device 3 can cover at least a portion of the recess.

The covering device 3 in the form of a roof strip or protective roof strip 32 can likewise also be provided in a transition region or joint gap between the roof panel 4 and the side panel 12, between the windshield 30 and the side panel 12, and/or between the rear window 12 and the side panel 12. The covering device 3 can thereby be fixed to the roof panel 4, the side panel 12, the windshield 30 and/or the rear window 31.

Instead of a continuous or one-piece side panel 12 which extends, for example, from the A-pillar to the B-, C- or D-pillar, a plurality of side panels 12 can likewise be provided, along which the at least one covering device 3 extends. This applies to all the examples of the invention.

In a further variant, the covering device 3 can be provided, for example, as a decorative element, for example a trim strip, in particular a rainwater trim strip, on the side panel 12 or the side panels 12 which form a side panel frame of the vehicle 2.

In a corresponding manner, the covering device 3 can also be provided as a decorative element, for example a trim strip, in particular a door trim strip, on the door panel 23 which forms a door frame of the vehicle 2. In particular, the covering device 3 with at least one integrated light guide can be provided, for example, in a transition region or joint gap between the door panel 23 and a side window 25 as a vehicle element. The covering device 3 is thereby fixed, for example, to the door panel 23. Furthermore, the covering device 23 can be arranged, for example, circumferentially around at least a portion or the entirety of the window opening on the door panel 23 and thus illuminate the outline of the side window of the vehicle, which likewise makes the vehicle easier to locate in the dark.

The covering device 3 can be fixed to the side panel 12, for example, as a rainwater trim strip and in a corresponding manner to the door panel 23, for example, as a door trim strip and can optionally additionally be received in a recess, where present, in the side panel 12 or door panel 23.

The strip or cap element of the covering device 3 in the variants described above, and also in the variant yet to be described with reference to FIG. 24-26, can additionally have at least one additional lip element on at least one side. In the fitted state, the lip element can thereby cover or conceal, for example, a portion of the respective body component 4, of the windshield 30 as a vehicle element, of the rear window 31 as a vehicle element, of a side window in the door, etc.

FIG. 24 is a perspective view of a vehicle 2 with further variants for the positioning of a covering device 3 according to the invention. In one variant, the covering device 3 with, for example, at least one integrated light guide is integrated in a roof rail 26. To that end, the covering device 3 is fixed to the roof rail 26 in the longitudinal direction. The roof rail 26 can optionally additionally be provided with a recess or step in the longitudinal direction, in which the covering device 3 can be received and which can be covered at least in part by the covering device 3. Likewise, in a further variant, the strip or cap element 16 itself can serve as or be in the form of a roof rail 26. As described above, the at least one light guide can thereby be integrated into the strip or cap element, for example molded or extruded into the strip or cap element or inserted into a cavity in the strip or cap element, to mention only a few examples. The strip or cap element can, if required, be provided on at least one side with at least one additional lip element or can also be without a lip element, depending on the function and intended use.

In another variant, the covering device 3 can be provided in a transition region or joint gap between the roof panel 4 as a body component 1 and a sunroof 27 or between the roof panel 4 and a glass roof (not shown). The covering device 3 can thereby be provided, for example, on the roof panel 4 and/or the sunroof 27 or on the roof panel 4 and/or the glass roof at least in the longitudinal direction and/or transverse direction and fixed to the roof panel 4 as a body component 1 and/or the sunroof 27 or to the roof panel 4 and/or the glass panel 4. The covering device 3 can thereby be arranged, for example, circumferentially around at least a portion or the entirety of a sunroof opening or around the glass roof. The sunroof and the glass roof each form vehicle elements.

The roof panel 4 can optionally have a recess in which the covering device 3 is received. The covering device 3 can cover the recess, for example, at least in part in the fitted state. The covering device 3 can additionally be arranged circumferentially around at least a portion of the sunroof 27 or glass roof.

By illuminating, for example, portions or regions of the vehicle roof and/or of a roof rail 26 etc., the vehicle can easily be located in the dark. This is advantageous in particular when the owner of the vehicle, for example, is looking down on his vehicle from an elevated position, for example from above onto a car park. In this manner, the vehicle owner can easily make out the vehicle 2. In particular, by illuminating at least portions of the vehicle outline by means of at least one covering device 3, a vehicle owner can easily tell whether the illuminated object is a vehicle, is his vehicle type, or is a completely different object. Furthermore, a portion of the vehicle roof, of the bonnet 28, of the windshield 30, of the rear window 31 and/or of the tailgate 29, etc. that is illuminated by means of at least one covering device 3 enables the vehicle 2 to be more easily located from above by means of a rescue helicopter, for example in the case of an accident.

FIG. 25 is a perspective view of a vehicle 2 with yet a further variant for the positioning of a covering device 3 according to the invention. In one variant, the covering device 3 with, for example, at least one integrated light guide forms a protective roof strip 32 or is integrated into a protective roof strip. Such protective roof strips 32, as are shown in FIG. 25, are applied, for example, under roof racks for the purpose of protection.

In order to integrate the covering device 3 into the protective roof strip 32, the covering device 3 is fixed to the protective roof strip 32 in the longitudinal direction. The protective roof strip 32 can optionally additionally be provided with a recess or step in the longitudinal direction, in which the covering device 3 can be received. The recess or step can moreover be covered at least in part, for example, by the covering device 3 in the fitted state.

As described above, in a further variant, the strip or cap element of the covering device 3 can itself function as or be in the form of a protective roof strip 32. As described above, the at least one light guide can thereby be integrated into the strip or cap element, for example molded or extruded into the strip or cap element or inserted into a cavity in the strip or cap element, etc.

Furthermore, the strip or cap element in the mentioned variants can be without a lip element or, if required, can be provided with at least one additional lip element, depending on the function and intended use. At least one light guide can thereby be integrated into the lip element and/or at least one light guide can be integrated into the strip or cap element. This applies to all the examples of the invention.

FIG. 26 is a further perspective view of a vehicle 2 with other variants for the positioning of a covering device 3 according to the invention.

A covering device 3 with at least one integrated light guide is provided in a window recess covering or a joint gap between the door panel 23 and the side window 25 of the vehicle 2. To that end, the covering device 3 is fixed, for example, to the door panel 23. In the case of a fixed side window (not shown), the rear window 31 or the windshield 30 as vehicle elements, the covering device 3 can also additionally or solely be fixed to such a window. In the case of the upwardly and downwardly movable side windows 25 of the vehicle doors, on the other hand, a covering device 3 is preferably fixed only to the door panel 23.

The covering device 3 can further also be provided in a transition region or joint gap between the windshield 30 as a vehicle element and the bonnet 28 as a body component 1. The covering device 3 can thereby be fixed to the bonnet 28 and/or to the windshield 30. The bonnet 28 can optionally be provided with an additional recess for receiving the covering device 3, the covering device 3 covering the recess, for example, at least in part in the fitted state.

In a further variant, the covering device 3 can be provided in a transition region or joint gap between the rear window 31 and the tailgate 29 as a body component 1 and can thereby be fixed, for example, to the rear window 31 and/or to the tailgate 29. The tailgate 29 can optionally likewise be provided with an additional recess for receiving the covering device 3, the covering device 3 covering the recess, for example, at least in part in the fitted state.

According to a variant, the covering device 2 can be provided in a joint gap or lateral joint between the tailgate panel 24 and a side panel 12 or between the tailgate panel 24 and a wing panel 33. The covering device 3 can thereby be fixed, for example, to the tailgate panel 24 and/or the side panel 12 or correspondingly to the tailgate panel 24 and/or the wing panel 33. The covering device 3 can further also be received and fixed in a recess in the tailgate panel 24, the wing panel 33 or the side panel 12. The recess can be covered, for example, at least in part by the covering device 3 in the fitted state. The arrangement of a covering device 3 according to the invention in a recess has already been shown and described above, for example, in FIGS. 14, 15 and 18.

In a further variant, the covering device 3 can also be provided in a joint gap or lateral joint between the bonnet panel 34 and a side panel 12 or between the bonnet panel 34 and the wing panel 33. The covering device 3 can thereby be fixed, for example, to the bonnet panel 34 or the side panel 12 or the wing panel 33. The panel to which the covering device 3 is fixed can optionally additionally have a recess for receiving the covering device 3, the covering device 3 covering the recess, for example, at least in part in the fitted state.

In a variant, the covering device 3 can further be provided in a joint or a joint gap of the tailgate panel 35 as a body component 1 and fixed to the tailgate panel 35. The covering device 3 can likewise also be in the form of, for example, a decorative strip or handle strip of the body component 1, in this case, for example, of the tailgate panel 35, or can be integrated into the decorative strip or handle strip, as has been described above for an example in FIG. 22.

As is shown in FIG. 26 in a further variant, the covering device 3 can also be provided in a joint, a front joint region or joint gap of the bonnet panel 34 and a front apron panel 36. As described above, the covering device 3 can be fixed, for example, to the bonnet panel 34 or the front apron panel 36 and can extend, for example, in the transverse direction or additionally also in the longitudinal direction of the bonnet or of the front apron.

Furthermore, in a variant in FIG. 26, the covering device 3 can also be provided in a transition region or joint gap between the front apron or the front apron panel 36 as a body component 1 and a radiator grill 37. The covering device 3 can thereby be provided circumferentially around at least a portion of the radiator grill 37 and can be fixed to the front apron panel 36 and/or to the radiator grill 37. The front apron panel 36 or the radiator grill 37 can optionally have a recess in which the covering device 3 is received. The covering device 3 can thereby cover the recess, for example, at least in part.

Moreover, in a further variant, the covering device 3 on the front or rear wing panel 33 as a body component 1 can be integrated, for example, into a decorative element, for example a trim strip, situated thereon. Likewise, the covering device 3 itself can be provided on and fixed to the front or rear wing panel 33 as an illuminated decorative element, for example an illuminated trim strip, in order to make the vehicle 2 easier to locate in the dark owing to the illuminated decorative element.

In another variant, the covering device 3 can be provided on the door panel 23, on a front bumper panel 38, on a rear bumper panel 39, on the front apron panel 36 or on the rear apron panel 40 as body components 1, in order to illuminate or light the body component 1 in question. In particular, the covering device 3 can be provided on the panel or body component 1 in question as a decorative trim or impact protection strip, as has been described above with reference to FIG. 21.

The covering device 3 is thereby in the form of an illuminated impact protection strip or trim strip on the body component 1 that is to be illuminated, or is integrated into such an impact protection strip or trim strip. The impact protection strip or trim strip can have a recess for receiving the covering device 3, which recess can be covered, for example, by the covering device 3 in the fitted state.

The covering device 3 can likewise also be provided, for example, in the joint or a joint gap between a vehicle lamp 41, for example the rear light or front light, and the rear apron panel 40 or rear bumper panel or the front apron panel 36 or the front bumper panel 38. By means of the covering device 3, the vehicle 2 can be illuminated in the region of the vehicle headlamps 41 even if the driver has not switched on the headlamps 41 themselves because, for example, he is not in the vehicle but is on the way to his vehicle. The covering device 3 can thereby be fixed to the vehicle headlamps 41 and/or to the body component 1.

In a further variant, the covering device 3 can also be provided on the vehicle mirror 42, for example in a joint or a joint gap between the casing 43 of the vehicle mirror 42 and the mirror, and can be fixed to the casing 43. Furthermore, the covering device 3 can also be fixed in any other position outside the casing 43 of the vehicle mirror 42. The vehicle mirror and the vehicle mirror casing form vehicle elements.

Illuminating the vehicle 2 by means of at least one covering device 3, as has been described above by way of example with reference to FIG. 14-26, has the advantage that the vehicle 2 can more easily be located by the vehicle owner, for example in the dark. Likewise, illumination by means of the covering device 3 can also be used to prevent, by means of the illumination, in particular in the dark, another vehicle from not seeing the vehicle mirror, for example, and damaging it when driving past in a narrow street. The same also applies when parking, for example in the dark. Illuminated outlines of the vehicle 2, for example the bonnet, the radiator grill, the roof, the windows, and illuminated functional parts, such as, for example, impact protection strips, and/or illuminated decorative strips, such as, for example, trim strips, can make the vehicle 2 more visible to another vehicle driver, for example when parking in the dark, owing to its at least one illuminated covering device 3. Accidental bumping of the other vehicle can thereby better be prevented.

In further aspects, the covering device may be a functional element which includes a display or a touch screen.

Figure 27:
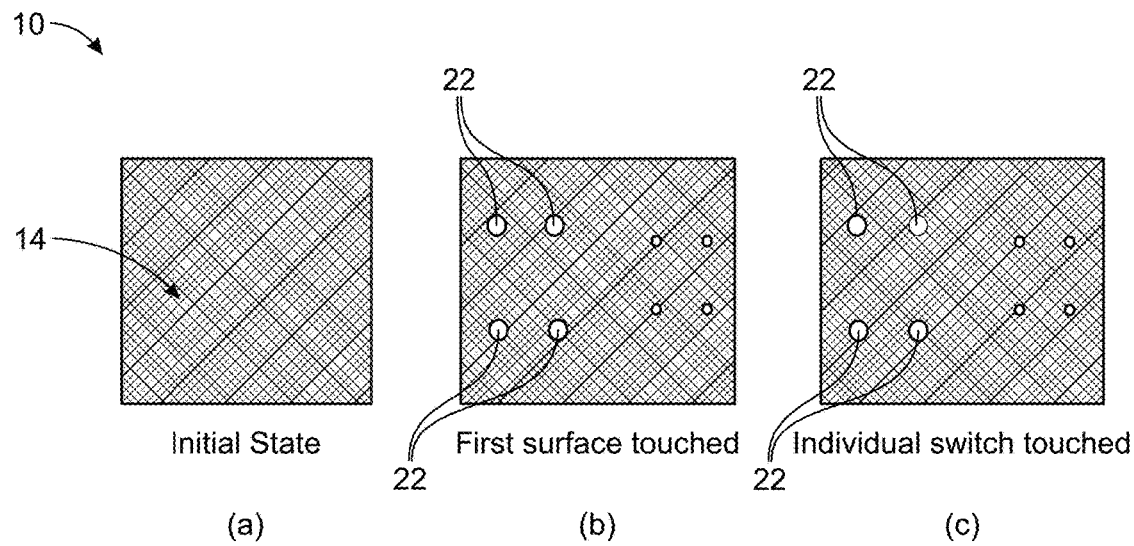
FIG. 27 shows photographs of a touch panel of an example of the invention in (a) an inactive initial state; (b) an intermediary state in which all icons are illuminated; and (c) an active state after the panel has been pressed in the region of one of the illuminated icons.

Referring to FIG. 27, a capacitive touch panel 210 may include a transparent or translucent panel substrate 212. A front surface 214 of the substrate 212 may include a conductive transparent or translucent metal layer 216 which, in use, is visible to a user. At least one light source 218 is associated with a back surface 220 of the substrate 212. The light source 218 is switchable between an on state in which an illuminated icon 222 is visible on the front surface 214 of the panel 210 and an off state in which no icon is visible on the front surface 214. In the embodiment shown in FIG. 27 there are four icons 222, each having a separate light source 218. However, any number and/or arrangement of icons 222 could be used.

Each icon 222 is associated with a switch 224 that is located adjacent the back surface 220. Each switch 224 is activable by a user pressing the touch panel 210 in the vicinity of the corresponding illuminated icon 222 to provide an output signal capable of performing a function.

The light sources 218 are switchable from the off state to the on state by a detected change in capacitance of the conductive transparent or translucent metal layer 216. The change in capacitance is caused by a conductive object, such as a finger, capacitively coupling to the conductive transparent or translucent metal layer 216. A conductive object can capacitively couple to the conductive transparent or translucent metal layer 216 by touching the front surface 214 of the substrate 212 or by being placed within the proximity of the front surface 214 (without physically touching the front surface 214). Once a change in capacitance is detected, a signal to switch the light sources 218 to the on state is generated and the icons 22 are illuminated and become visible on the front surface 214.

Alternatively, the light sources 218 could be activated by other means, such as by a switch that could be activated by, for example, a user inserting a key into the ignition of a vehicle or by a sensor in the driver's seat of a vehicle which is activated when a person sits on the seat.

The substrate 212 can be formed from any transparent or translucent material. Plastics, such as polycarbonate or acrylic are particularly suitable. The substrate 212 is formed into a desired shape by moulding and/or other forming techniques. In the illustrated embodiments, the substrate 212 is generally planar and rectangular in plan view however, it will be appreciated that it may be any suitable shape or curvature depending on the intended end use.

Figure 28:
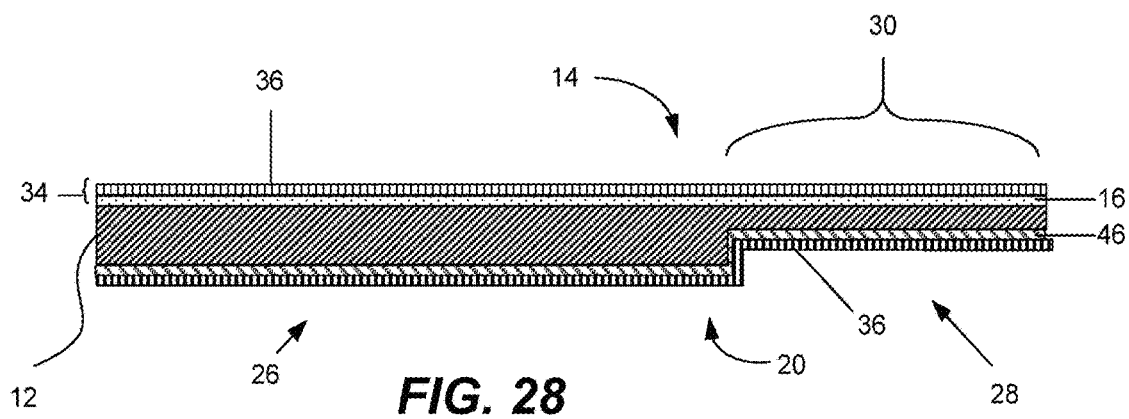
FIG. 28 shows a cross sectional schematic view of an example of a touch panel substrate.
Figure 30:
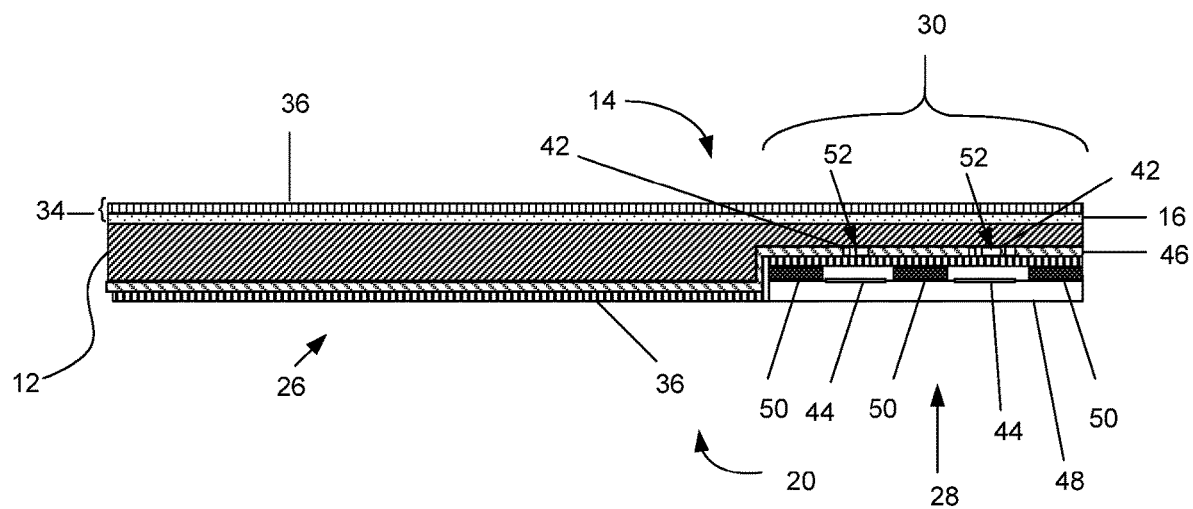
FIG. 30 shows a cross sectional schematic view of the touch panel substrate shown in FIG. 2 with associated capacitive switches on the back surface.
Figure 31:
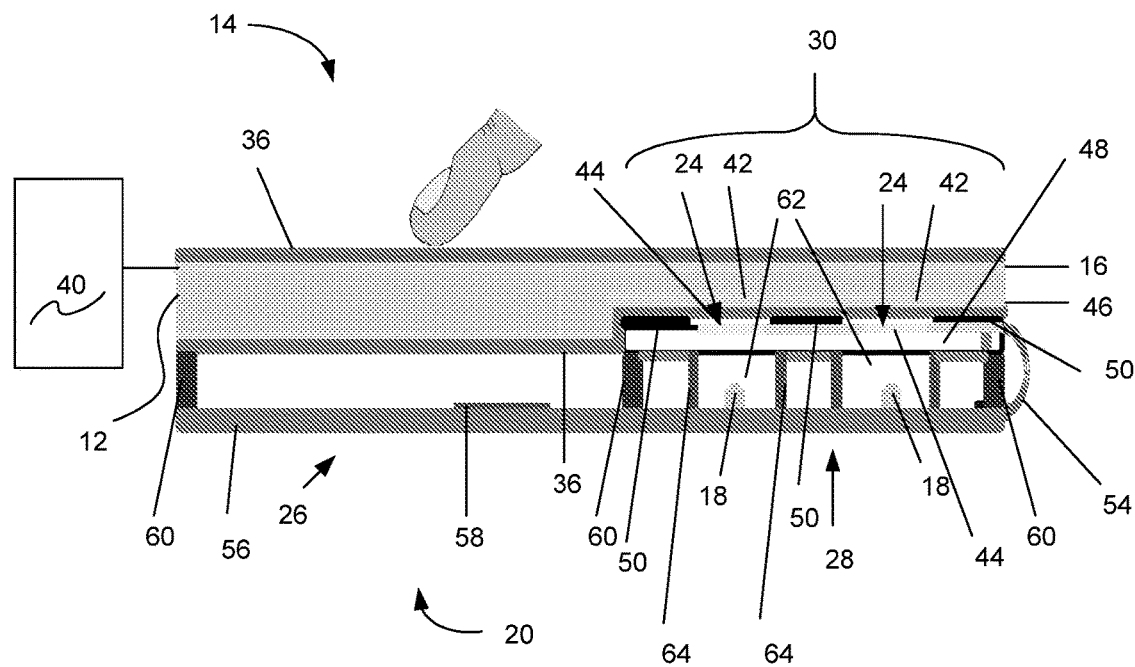
FIG. 31 shows a cross sectional schematic view of an assembled touch panel comprising the touch panel substrate shown in FIG. 2 with associated capacitive switches and PCB on the back surface.

As best seen in FIGS. 28, 30, and 31, in some embodiments the substrate 212 comprises a first section 226 and a second section 228. The first section 226 is thicker in cross section than the second section 228. The substrate at the second section 228 is more flexible than the substrate at the first section 226 to allow for deflection of the substrate at the second section 228 when a small force is applied, such as when a user touches the panel 210. The thinner second section 228 can be formed into the substrate 212, moulded into the substrate 212 or it can be machined into the substrate 212. The second section 228 forms an operating region 30 in which the icons 222 and switches 224 are located.

Figure 29:
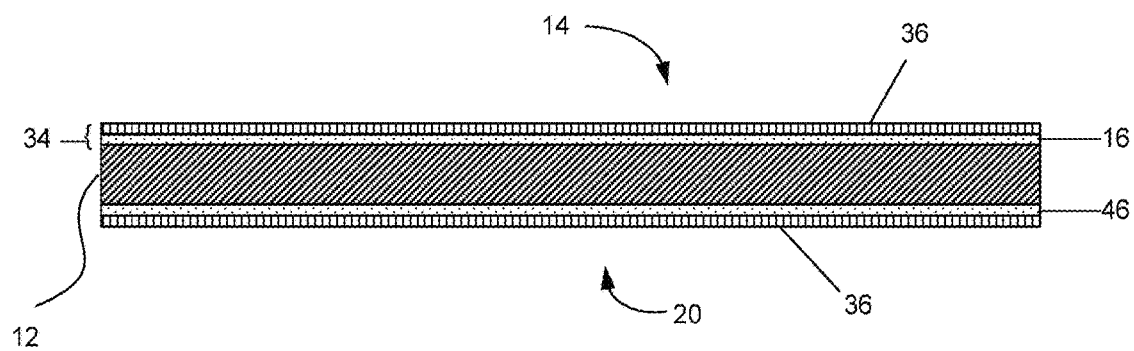
FIG. 29 shows a cross sectional schematic view of another example of a touch panel substrate of another embodiment.
Figure 32:
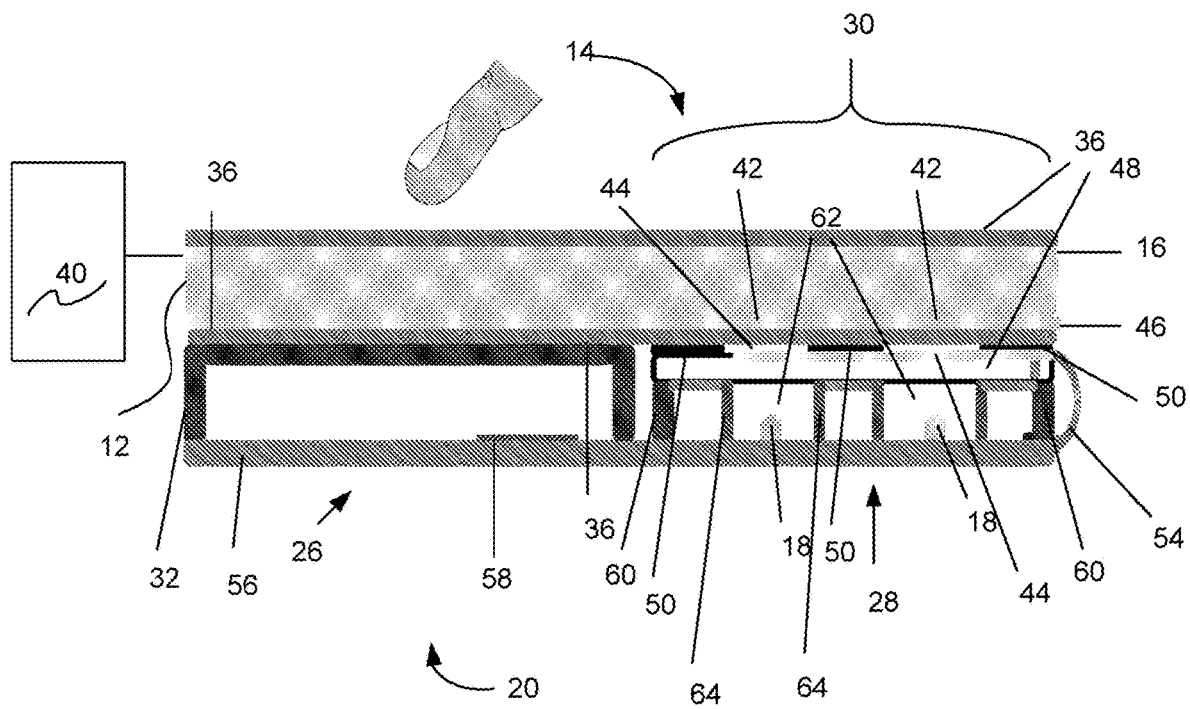
FIG. 32 shows a cross sectional schematic view of an assembled touch panel comprising the touch panel substrate shown in FIG. 3 with associated capacitive switches and PCB on the back surface.
Figure 33:
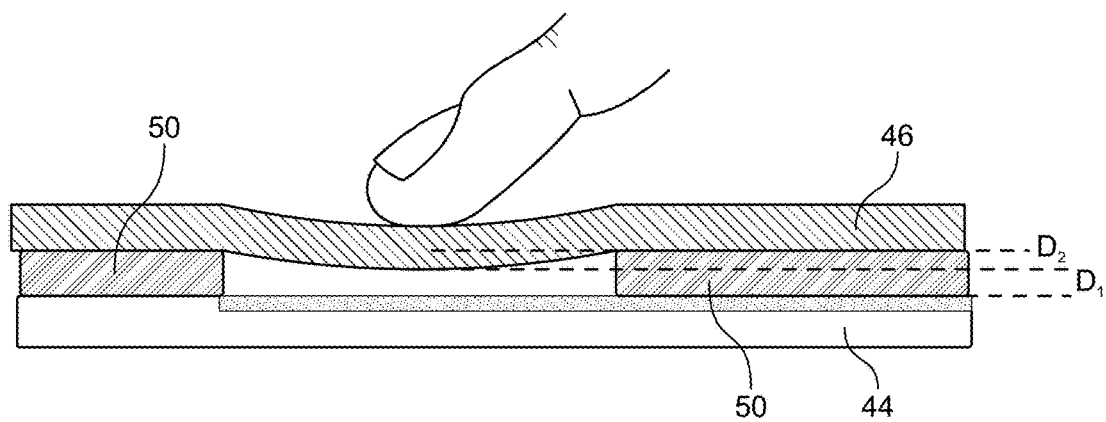
FIG. 33 shows a cross sectional schematic view showing the operation of a capacitive switch.

In alternative embodiments shown in FIGS. 29 and 32, the substrate 12 has a relatively uniform thickness in cross section and the first section 226 is supported by a support frame 232 so that it is less flexible than the remainder of the substrate which forms the second section 228 or operating region 230.

The conductive transparent or translucent metal layer 216 is formed from a metal, alloy or conductive metalloid. As used herein, the term "metal layer" includes layers of metal, conductive alloy or conductive metalloid. Suitable metals include chromium, aluminium, titanium, nickel, molybdenum, zirconium, tungsten, niobium, tantalum, cobalt, manganese, silver, zinc, mixtures of any of the aforementioned, oxides of any of the aforementioned, nitrides of any of the aforementioned, borides of any of the aforementioned, carbides of any of the aforementioned, and alloys of any of the aforementioned metals. Suitable alloys include steel and stainless steel. Suitable conductive metalloids include silicon.

The front surface 214 of the substrate 212 can be highly polished or contain a texture so that when the metal layer 216 is deposited, the surface resembles a metal-look finish such as brushed stainless steel. As such, the conductive transparent or translucent metal layer 216 meets aesthetic and durability requirements of users within the automotive, domestic and building industries. The desired texture can be applied to a mould and/or forming tool and transferred to the front surface 214 during the manufacturing process.

The conductive transparent or translucent metal layer 216 can be deposited using any suitable elemental deposition technique, including Physical Vapour Deposition (PVD), Chemical Vapour Deposition (CVD), or the like. More particularly, the substrate 212 may be positioned in one or more sputter deposition chambers with either planar or rotary magnetron targets, and with deposition of the transparent or translucent metal layer 216 being achieved via DC sputtering from an elemental target. Other processes for applying or depositing layers of metallic layers can also be used. The conductive transparent or translucent metal layer 216 may be deposited or applied to the entire front surface 214 of substrate 212. The thickness of the metal layer 216 will determine the transparency or translucency of the layer. It has been found that a thickness of 2 nm to 50 nm provides a conductive transparent or translucent metal layer 216 that allows sufficient light to pass through so that the illuminated icon 222 is visible from the front surface 214 even though the light source 218 is located at the back surface 220 of the substrate 212. A thickness of about 30 nm is particularly suitable.

The light transmission of the conductive transparent or translucent metal layer 216 is preferably between 5% and 20%, such as 5%, 6%, 7%, 8%, 9%, 10%, 11%, 12%, 13%, 14%, 15%, 16%, 17%, 18%, 19% or 20%. In specific embodiments, the light transmission of the conductive transparent or translucent metal layer 216 is about 8%. At these levels of translucency, when the light source(s) 18 is/are off, there is no visible icon, indicia or other symbol visible on the front surface 214. This means that the panel 210 has a 'dead' frontal appearance and continuous metal-look finish when the icon(s) 222 is/are not illuminated. However, for certain applications it may be desirable for the conductive transparent or translucent metal layer 216 to be completely transparent.

Figure 34:
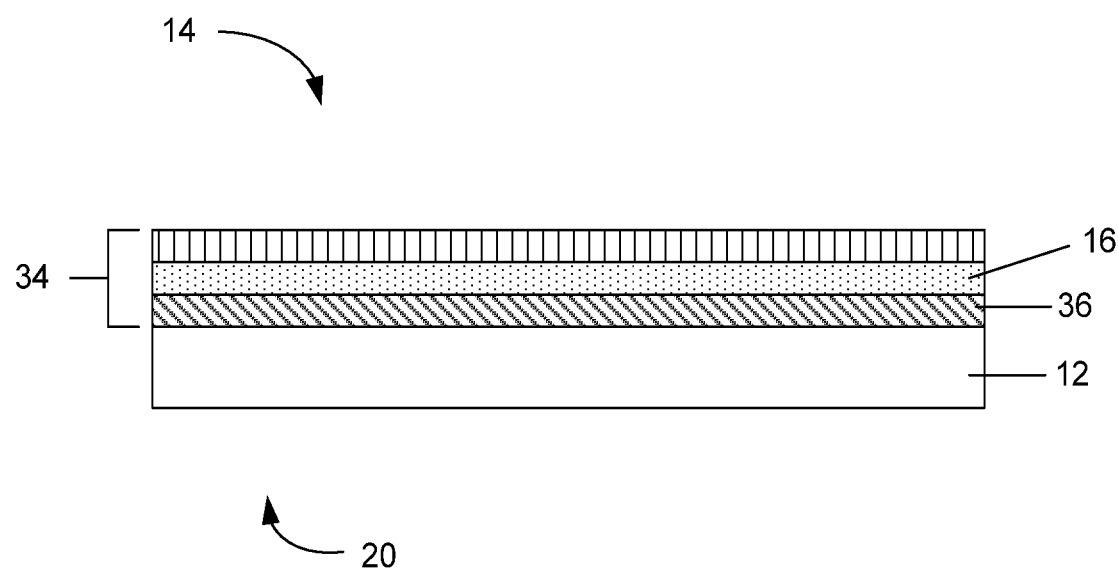
FIG. 34 shows a cross sectional schematic view of an example of a touch panel substrate.

As shown in FIGS. 28, 29, and 34 the conductive transparent or translucent metal layer 216 may be part of a multilayer transparent or translucent stack 234 on the front surface 214 of the substrate 212. The multilayer stack may comprise other layers such as hard coat layers, and the like. For example, a hard coat 236 can be applied to the substrate 212 either on top of the conductive transparent or translucent metal layer 216 (FIG. 28) or between the substrate 212 and the conductive transparent or translucent metal layer 216 (FIG. 34).

The hard coat 236 is formed from one or more abrasion resistant layers. As is known in the art, a primer layer may be used between the hard coat 236 and the substrate 212 or conductive transparent or translucent metal layer 216 to enhance adhesion of the hard coat 236. The hard coat 236 can be formed from one or more of a range of materials known for this purpose in the art, including an organosilicon, an acrylic, a urethane, a melamine or an amorphous organosilicon ($SiOxCyHz$). Organosilicon hard coats are particularly suitable and suitable materials include Silicone Hard Coat SHC 5020 from Momentive and GE587B from MomentiveGE Bayer. The hard coating material may be applied in a solvent, such as an alcohol solvent. The hard coat 236 can be applied using any of the coating techniques known in the art, including flow coating, dip coating, spray coating, spin coating, etc. and then cured using techniques known in the art, such as heating to a temperature of about 100° C. to about 200° C. for the appropriate required period of time.

Intermediate layers 238 may be deposited between the respective layers of the multilayer stack 34. The intermediate layers 238 may assist in adhesion between the respective layers and minimise or prevent delamination. The intermediate layers 238 will generally be translucent and may be formed from silica.

Optionally, the front surface 214 may also be coated with other functional layers, such as anti-glare coatings, anti-fingerprint coatings, hydrophobic coatings or diffuse surface coatings.

During use of the touch panel 210, a user may touch the front surface 214 such that the user's finger capacitively couples with the conductive translucent layer 216. The capacitive coupling may be through the hard coat 236 and/or intermediate layers 238. A detector 240 then measures the change in capacitance, as is known in the art. The detected change in capacitance produces an output signal from the detector, which triggers the illumination of the light sources 218, as subsequently described in more detail.

The switches 224 are capacitive switches that are activated by the deflection of a surface. Each capacitive switch comprises two conductive pads or surfaces 242 and 244 that are spaced from one another and which, when one of the pads or surfaces 242 is deflected toward the other pad or surface 244 the change of capacitance resulting from the deflection is monitored and measured. Once the detected change in capacitance exceeds an established threshold the output signal is produced. One of the conductive pads or surfaces 244 of the capacitive switch 224 is translucent whilst the other conductive pads or surfaces 242 is opaque but contains a translucent section in the form of the icon 222 which is illuminated by the light source 218.

As the switch 224 is dependent on deflection of the surface 242 and the deflection of the surface is dependent on the force applied by a user, the switch 224 thresholds can be tuned based on application of force. For example, the switch 224 could trigger when a small deflection or force is exerted and provide a secondary trigger if the deflection and force is further increased. This could be used on speed related functions such as exterior mirror adjustment. In this example, the more force that is applied to the switch 224, the more the surface deflects and the faster the exterior mirror adjusts.

In the illustrated embodiments, the first conductive pad 242 of each of the capacitive switches 224 is part of a substantially continuous conductive opaque layer 246 on the back surface 220 of the substrate 212. The conductive, opaque layer 246 does not allow transmission of light from the light source(s) 218 located behind the layer 246 to any substantial extent. The conductive opaque layer 46 is preferably a metallic layer. Again, as used herein the term "metallic layer" includes layers of metal, conductive metalloids and/or conductive alloys. Conductive metals which are suitable for this purpose include copper, aluminium, and silver. Conductive alloys which are suitable for this purpose include chrome zirconium alloy. The metallic layer may also consist of successive layers of copper and chrome. The conductive opaque layer 246 can be deposited on the back surface 220, directly or indirectly, by any suitable process such as sputtering or vapour deposition. The metal layer of the conductive opaque layer 246 may have a thickness of 70 nm.

The conductive, opaque layer 246 may be part of a multilayer stack formed on the back surface 220. For example, a hard coat 236 may cover the conductive opaque layer 246 on the back surface 220. The hard coat 236 may be applied to all or part of the substrate 212. The thickness of the conductive, opaque layer stack may be about 460 nm.

The second pad or surface 244 is translucent and conductive. The second pad or surface 244 is positioned adjacent the back surface 220 at the operating region 230. The second pad or surface 244 is an Indium Tin Oxide (ITO) pad (or a similar translucent conductive material) and each pad 244 is positioned directly below the translucent section that forms the icon 222. One second pad 244 is associated with each icon 222 that is associated with a switching function. The second pads 244 are formed on a translucent touch pad substrate 248, which is formed from a suitable translucent material such as polycarbonate, acrylic or glass. The pad(s) 244 are formed via deposition directly onto the touch pad substrate 248. Alternatively, the pad(s) 244 can be deposited onto a thin translucent film, such as a Polyethylene-terephthalate (PET) film, which is then adhered to the touch pad substrate 248. The touch pad assembly is attached to the back surface 220 of the substrate 212 at the thinner second section 228. In embodiments in which the substrate 212 does not have a thinner section (i.e. has a relatively constant thickness cross section) the touch pad assembly is attached to the back surface 220 underneath the icons 222. The touch pad substrate 248 can be attached to the back surface 220 using any suitable means. In the illustrated embodiments, the touch pad substrate 248 is attached to the back surface 220 using double sided adhesive with die spacers 250. The touch pad substrate 248 can be shaped or curved to match the form of the visual surface.

As discussed, the conductive opaque layer 246 has one or more translucent patterns 252 each in the desired shape of an icon 222. The translucent patterns 252 are located in the operating region 230 and allow light transmission from the light source(s) 218 therethrough. The translucent patterns 252 can be formed in the opaque layer 246 by laser ablation or by suitable masking when the opaque layer 246 is deposited. Etching processes known in the art could also be used for this purpose. Light from the light source 218 is able to pass through the translucent patterns 252 so that the corresponding icon 222 is visible from the front surface 214 when the light source 218 is illuminated. In the illustrated embodiments, there is more than one translucent pattern 252 formed in the opaque layer 246 with each pattern 252 being different and in the shape of a specific icon 222. Each icon 222 represents a function that can be activated by a user pressing the touch panel 210 over an illuminated icon 222 to produce an output signal. If, in forming the translucent pattern 252, an excessive amount of conductive material is removed, the conductive opaque layer 46 can be coated with a transparent or translucent conductive material.

It will be appreciated that the translucent patterns 252 can be formed on either of the two conductive pads or surfaces 242 and 244 of the capacitive switch 224. For example, the translucent patterns 252 could be formed on the second conductive pad or surface 244 and the first pad or surface 242 may be transparent or translucent so that light passing through the second pad or surface 244 also passes through the first pad or surface 242.

Electrical connectors 254 connect each capacitive switch 224 to a Printed Circuit Board (PCB) 256, which contains a microcontroller and LED light sources 218. The electrical connectors 254 may be flex tail connectors that are electrically connected to the PCB 256 using Zero Insertion Force (ZIF) connectors or similar.

One or more spacers 250 are positioned between the top of the second pads 244 and the conductive, opaque layer 246. The spacer(s) 250 maintain a small gap between the conductive touch pads 244 and the conductive opaque layer 246. When a user presses the panel 210 in the region of an illuminated icon 222 the touch is measured using substrate deflection between the conductive touch pad 244 and the conductive opaque layer 246. Specifically, as the surface deflects there is a capacitance change between the touch pad 244 and the conductive opaque layer 246 and it is this capacitive change which is detected and processed by a processor 258 capable of discerning the small change in capacitance. The processor 258 is part of the PCB 256. The PCB 256 is attached to the back surface 220 of the substrate 212 via a plurality of stand-offs 260, which hold the PCB 256 in a spaced arrangement with respect to the substrate 212.

Each capacitive switch 224 is associated with a light source 218 which illuminates the icon 222 associated with the corresponding switch 224 when required. Light emitting diodes (LEDs) are particularly suitable for use as the light sources 218. Other suitable light sources include organic light emitting diodes (OLEDs) and surface- or edge-lit plastic sheet, columns and the like such as Acrylite® plastic materials available from Evonik Industries. Each icon 222 may be illuminated with one LED or with a group of LEDs. In embodiments in which there is more than one icon 222, there is a single group of LEDs (one or more LEDs in each group) 218 for each icon 222, thereby allowing each icon 222 to be illuminated and coloured individually. Each group of LEDs 218 provides a homogenous light and illuminates a single icon 222 which is then visible to a user when looking at the front surface 212 of the panel 210. Alternatively, multiple icons 222 can be illuminated using the same LED light source(s) 218 and/or a diffusing light guide if the icons are homogenously illuminated at the same time.

Optionally, each capacitive switch 224 may also be associated with means for providing haptic or audio feedback to the user. Haptic feedback may be provided by way of a vibration created by a vibrator, a low-frequency sound produced by a speaker, or the like.

To minimise stray light from one group of LEDs illuminating an adjacent icon 222, each group of LEDs may be located in a light channel 262 whereby when one or more of the LEDs in the group is on, light emanating from the light source 218 is directed at only one translucent pattern 252. The light channels 262 may be formed by walls 264 extending between the PCB 256 and the touch pad substrate 248. The light source 218 may be in modular form so that it can be used on various products, lighting different translucent patterns 252 in multiple colours, simultaneously. For example, the same translucent pattern 252 may be illuminated in blue or red depending on the function status.

Optionally, a lens or light diffuser may be positioned between the light source 218 and the translucent pattern 252 to control the light path.

Each switch 224 can be individually activated by a user pressing the touch panel 210 in the vicinity of the illuminated icon 222 to provide an output signal capable of performing a function. For example, if a user were to press an illuminated icon 222 on the panel 210 then the module detector 240 detects that trigger and provides an output signal, which subsequently turns on a light or any other function that can be controlled via an electrical signal.

In use, the first touch by a user on the front surface 214 of the panel 210 forms a capacitor between the conductive translucent layer 216 and the user's finger. The resultant capacitance change brought about by the user's interaction is detected by the detector 240 and the resultant output signal from the device is used to illuminate the required LED light sources 218. It will be appreciated that this "first touch on" function may not strictly rely on deflection based capacitive activation. The light from the light source 218 then passes through the translucent touch pad 244 and translucent pattern 252. The light passing through the translucent pattern 252 is then projected through the conductive translucent layer 216 and illuminated icons 222 become visible to the user looking at the front surface 214 of the panel 210. When all nominated icons 222 are visible the user can then touch an individual icon 222 at its discrete location. The touch will result in deflection of the capacitive switch 224 which is detected by the detector 240, as described previously, and a corresponding signal is then used to control a function, such as switching on a light or any other function that can be controlled via an electrical signal.

Other embodiments of the touch panel 210 are also envisaged in which all icons could be illuminated by powering on the touch panel 210. Alternative embodiments can include icons 222 without touch switch functionality but hidden until illuminated, a combination of hidden until illuminated icons, icons with switch functionality, or icons that are illuminated constantly.

The panel 210 is especially suited to applications in which a 'dead' frontal appearance and continuous metal-look finish is desired in combination with hidden until illuminated icons with touch detection capability. For example, the panel 210 could be used in automotive interiors or white goods appliances where an 'uncluttered' look is desired Although the present invention has been described thoroughly above by means of preferred examples, it is not limited to those examples but can be modified in a variety of ways. The examples shown in FIGS. 14 to 26 can also be combined with one another, in particular individual features thereof.

In particular, the invention is also not limited to the body components shown by way of example in FIG. 14-26. For example, the roof panel shown in FIGS. 16, 17 and 23 to 26 and the side panels on both sides of the vehicle can, for example, be combined to form a continuous or common panel. Likewise, the side panel, for example, can be combined with at least one panel for the A-, B-, C- or D-pillar. The invention is further not limited to the form of the strip or cap element and of the lip elements as shown in FIGS. 14 to 22. The strip or cap element and the lip element can have any form which is suitable for covering at least in part a recess, gap or joint gap in a body component or of two body components. Likewise, the lip element can also be omitted completely if, for example, the at least one light guide is integrated into the strip or cap element.

Furthermore, the covering device 3 can be arranged at any other position on the outside of the vehicle 2 and can be fixed to or integrated with any body component 1, any window, any handle, any decorative element, any functional element, etc. The covering device can further also be in the form of a handle, a decorative element or a functional element. Furthermore, the covering device or at least a part thereof, as has been described above by way of example with reference to FIG. 14-26, can also additionally be designed to illuminate in color, for example by the use of, for example, colored LEDs and/or by optionally additionally coloring the at least partially transparent or translucent material of the covering device 3 in order to illuminate the covering device 3 in color.

The panels mentioned with reference to FIG. 14-34, such as, for example, the side panel, door panel, tailgate panel, wing panel, bonnet panel, tailgate panel, front apron panel, rear apron panel, bumper panel, touch screen etc., can be metal panels but likewise, for example, plastics panels or a combination of metal, plastics and fiber reinforced plastics panels, etc. The invention is not limited to metal, plastics and fiber reinforced plastics panels and combinations thereof.

The features of the invention disclosed in the above description, in the claims and in the figures can be essential for realizing the invention in its various embodiments both individually and in any desired combination.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

1 body component
2 vehicle
3 covering device
4 roof panel
5 recess
6 strip or cap element
7 lip element
8 gap
9 lighting device
10 light source
11 light guide
12 side panel
13 opening
14 windshield
15 rear window
16 A-pillar
17 B-pillar
18 C-pillar
19 D-pillar
20 holder
21 groove
22 fixing portion
23 door panel
24 tailgate panel
25 side window
26 roof rail
27 sunroof
28 bonnet
29 tailgate
30 windshield
31 rear window
32 protective roof strip
33 wing panel
34 bonnet panel
35 tailgate panel
36 front apron panel
37 radiator grill
38 front bumper panel
39 rear bumper panel
40 rear apron panel
41 vehicle lamp
42 vehicle mirror
43 casing of the vehicle mirror
100 lamp
110 lamp
120 housing
122 back panel
124 web
126 web 128 recess
130 installation space
132 lid
140 light conductor
142 incoupling area
144 light conductor system
146 total reflection area
148 outcoupling area
160 covering device
162 covering device system
200 housing
210 capacitive touch panel
212 transparent or translucent panel substrate
214 front surface
216 conductive transparent or translucent metal layer
218 light source
220 back surface
222 illuminated icon
224 switch
226 first substrate section
228 second substrate section
230 operating region
232 support frame
234 multilayer transparent or translucent stack
236 hard coat
238 intermediate layer
240 detector
242 opaque conductive pad or surface
244 translucent conductive pad or surface
246 continuous conductive opaque layer
248 translucent touch pad substrate
250 double sided adhesive die spacers
252 translucent pattern
254 electrical connector
256 printed circuit board (PCB)
258 processor
260 stand-off
262 light channel
264 wall
280 recess
300 installation space
400 light conductor
420 incoupling area
460 total reflection area
480 outcoupling area
600 covering device
1110 lamp unit
1111 housing
1112 printed circuit board
1113 LED
1114 light conductor
1115 light foil
1116 light window
1117 control unit
1120 covering device
1210 lamp unit
1211 housing
1212 printed circuit board
1213 LED
1214 light conductor
1222 printed circuit board
1223 LED
1224 light conductor
1235 light foil
1236 light window
1247 control unit
1250 covering device
1336 covering device
1340 coating
1416 lamp unit
1440 light ray
1450 light cone
1516 lamp unit
1550 light cone
1560 light cone
1616 light unit
1650 light cone
1660 light cone
2110 lamp unit
2120 covering device
2121 transparent region
2130 light cone
3110 lamp unit
3120 covering device
3121 opening
3200 light conductor
11111 recess
11112 recess

What is claimed is:

1. A covering device configured to fully or partially cover one or more of a recess, a flat portion, a curved portion, and a stepped portion of at least one of a vehicle body component and a vehicle part, the covering device comprising:
a cover element; and
at least one lip element which is detachably connected to the cover element on at least one of its longitudinal sides, wherein the at least one lip element is detachably connected to the cover element using clamping, and wherein the cover element comprises at least one holder for receiving at least one fixing portion of the at least one lip element, and
wherein the cover element is provided by a strip element or a cap element,
wherein both the covering device and the at least one lip element are formed from a transparent or translucent material such that light from a lighting device can shine through,
wherein the cover element is made at least partly of a polymeric substrate which is coated with a chromium-based reflective coating material, and
wherein the polymeric substrate and the chromium-based reflective coating are at least partially translucent such that light from the lighting device can shine through, and
wherein the at least one lip element is a separate component than the cover element and is formed at a side of the cover element and rests on the vehicle body so that the cover element is not in direct contact with the vehicle body, and wherein the transparent or translucent material forming the at least one lip element is mixed with an afterglow pigment or a phosphorescent pigment such that the at least one lip element glows when irradiated with visible light.

2. The covering device according to claim 1, further comprising the lighting device, wherein the lighting device has at least one of a light source and at least one afterglow pigment which is mixed with material of the covering device or is applied to an outside of the covering device as an afterglow ink, afterglow foil or afterglow paint.

3. The covering device according to claim 1, further comprising at least one light guide which is integrally formed into the covering device or provided as a separate component.

4. The covering device according to claim 3, wherein the light guide is at least one of extruded or injection molded into a cover element and arranged in a cavity of the covering device.

5. The covering device according to claim 3, wherein the light guide is at least one of coupled to the at least one light source and formed as an elongate light guide, a lightguiding foil or a light-guiding fabric.

6. The covering device according to claim 1, wherein the covering device is a functional element which comprises a display, a touch screen, a protective roof strip, a roof rail, a handle strip, or an impact protection strip.

7. The covering device according to claim 1, further comprising:
at least one light conductor; and
at least one light conditioning area configured to be used for tinting, dying, reflecting, or
scattering within at least one of the at least one light conductor using at least one additive for the polymeric substrate.

8. The covering device according to claim 1, wherein the chromium-based reflective coating is an alloy of chromium and a dopant material, the dopant material being selected from hexagonally close-packed transition metals, and the alloy having a crystal structure of a primary body-centered cubic phase in coexistence with a secondary omega hexagonally close-packed phase.

9. The covering device according to claim 8, wherein the alloy is a binary alloy of chromium and the dopant material.

10. The covering device according to claim 8, wherein an atomic percentage of the dopant material in the alloy ranges from about 1.9 at. % to about 5.8 at. %.

11. The covering device according to claim 8, wherein the dopant material is selected from hexagonally close-packed transition metals zirconium, titanium, cobalt, hafnium, rubidium, yttrium and osmium.

12. The covering device according to claim 8, wherein the dopant material is selected from hexagonally close-packed transition metals zirconium, titanium and cobalt.

13. The covering device according to claim 8, wherein the alloy is a binary alloy and the dopant material is zirconium, and wherein an atomic percentage of the zirconium in the binary alloy ranges from about 4.5 at. % to about 5.8 at. %.

14. The covering device according to claim 8, wherein the alloy is a binary alloy and the dopant material is titanium, and wherein an atomic percentage of the titanium in the binary alloy ranges from about 1.9 at. % to about 5.8 at. %.

15. The covering device according to claim 8, wherein the alloy is a binary alloy and the dopant material is cobalt, and wherein an atomic percentage of the cobalt in the binary alloy ranges from about 1.9 at. % to 5.7 at. %.

16. The covering device according to claim 8, wherein the chromium-based reflective coating has a thickness of 200 nm, 100 nm, from 40 nm to 80 nm, from 50 nm to 70 nm, or about 60 nm.

17. The covering device according to claim 8, wherein the polymeric substrate is formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-arylates, acetal and blends of these.

18. The covering device according to claim 8, wherein the polymeric substrate is formed from a material selected from the group consisting of polycarbonate, poly(2,2'-dihydroxyphenylpropane) carbonate, polydiethyleneglycol bis(allyl carbonate), polymethylmethacrylate, polystyrene, and blends thereof.

19. The covering device according to claim 8, wherein the polymeric substrate comprises a pre-coated film which is a hardcoat, an inorganic oxide, or a thin metal film, or a combination thereof.

20. A system comprising a covering device according to claim 1 and at least one lighting device, wherein the system provides a multifunction lamp unit.

21. The system according to claim 20, wherein the vehicle body component which is at least partly covered by the covering device is a roof panel, a door panel, a wing panel, a bonnet panel, a tailgate panel, a front apron panel, a front bumper panel, a rear bumper panel, a rear apron panel, or a side panel of a vehicle.

22. The system according to claim 20, wherein the vehicle body component comprises a first body component and a second body component, the first and the second body components together form a recess, the recess is covered at least in part by the covering device. and a light from a lighting device shines through at least a portion of the covering device.

23. The system according to claim 20, wherein the vehicle body component and the vehicle part together form a recess, the recess is covered at least in part by the covering device, and a light from a lighting device shines through at least a portion of the covering device.

24. The system according to claim 20 wherein the vehicle part is a side window, a sunroof, a glass roof, a windshield, a rear window, a radiator grill, a vehicle lamp, a vehicle mirror, a vehicle mirror casing, a camera, a camera pod, a display, a touch screen, or a rear view device.

25. The system according to claim 20, wherein the at least one lighting device is part of at least one of the vehicle body components, the vehicle part, and the covering device.

26. The system according to claim 20, wherein the first body component is a roof panel and the second body component is a side panel.

27. A vehicle comprising a system according to claim 23, wherein the covering device extends in at least one of a longitudinal direction and a transverse direction of the vehicle along a recess in the vehicle body component or in the system.

28. The vehicle according to claim 27, wherein the covering device extends in at least one of a longitudinal direction and a transverse direction of the vehicle along a recess in a first or a second body component of the system or along a common recess of the first and second body components of the system.

29. The vehicle according to claim 27, wherein the covering device extends in at least one of a longitudinal direction and a transverse direction of the vehicle along a recess between the vehicle body component and another vehicle body component.

30. The covering device according to claim 1, wherein the covering device comprises a capacitive touch panel comprising:
a transparent or translucent panel substrate, a front surface of the substrate comprising a continuous conductive transparent or translucent metal layer, which, in use, is visible to a user,
wherein the lighting device is switchable between an on state in which an illuminated icon is visible on the front surface of the panel and an off state in which the illuminated icon is not visible on the front surface of the panel,
wherein the conductive transparent or translucent metal layer is applied to the entire front surface of the substrate, where the lighting device is switchable from the off state to the on state by a detected change in capacitance resulting from an object capacitively coupling with the conductive transparent or translucent metal layer, once the change in capacity is detected, a signal to switch the light sources to the on state is generated and the icons are illuminated and become visible on the front surface; and at least one capacitive switch associated with the back surface of the substrate able to be activated by a user pressing the touch panel in a vicinity of an illuminated icon providing an output signal capable of performing a function.

31. The covering device according to claim 30, wherein the switch is a capacitive switch that is activated by the deflection of a surface.

32. The covering device according to claim 30, wherein the conductive transparent or translucent metal layer is formed from a metal, alloy or conductive metalloid selected from the group consisting of chromium, aluminium, titanium, nickel, molybdenum, zirconium, tungsten, niobium, tantalum, cobalt, manganese, silver, zinc, silicon, mixtures of any of the aforementioned, oxides of any of the aforementioned, nitrides of any of the aforementioned, borides of any of the aforementioned, carbides of any of the aforementioned, alloys of any of the aforementioned metals, steel, stainless steel, silicon.

33. The covering device according to claim 30, wherein the front surface of the substrate has a substantially uniform appearance with no visible icons or marks when the light source is in the off state.

34. The covering device according to claim 30, wherein the light transmission of the conductive transparent or translucent metal layer is from 5% to 20%.

35. The covering device according to claim 30, wherein the front surface is at least one of a textured or machined surface, and the front surface is a curved or flat surface.

36. The covering device according to claim 30, wherein each switch is associated with a separate lighting device.

37. The covering device according to claim 36, wherein the lighting device associated with each switch is one or more light emitting diodes (LEDs).

38. The covering device according to claim 37, wherein a change in intensity or color of the light from the LED is used to indicate that an associated switch has been activated.

39. The covering device according to claim 30, wherein the light device is located in a light channel, which, when the light source is on, directs light towards the back surface of the substrate.

40. The covering device according to claim 30, wherein different levels of switch activation can occur depending on the level of force applied by a user.

41. A covering device configured to fully or partially cover one or more of a recess, a flat portion, a curved portion, and a stepped portion of at least one of a vehicle body component and a vehicle part, the covering device comprising:

a cover element; and at least one lip element which is detachably connected to the cover element on at least one of its longitudinal sides, wherein the at least one lip element is detachably connected to the cover element using clamping, and wherein the cover element comprises at least one holder for receiving at least one fixing portion of the at least one lip element, wherein the cover element is provided by a strip element or a cap element, wherein the covering device is designed so that light from a lighting device can shine through at least a portion of the covering device, wherein the cover element is made at least partly of a polymeric substrate which is coated with a chromium-based reflective coating material, and wherein the polymeric substrate and the chromium-based reflective coating are at least partially translucent such that light from the lighting device can shine through, and wherein the at least one lip element is a separate component than the cover element and is formed at a side of the cover element and rests on the vehicle body so that the cover element is not in direct contact with the vehicle body, and wherein a material forming the at least one lip element is mixed with an afterglow pigment or a phosphorescent pigment such that the at least one lip element glows when irradiated with visible light.

* * * * *